US010638492B2

(12) United States Patent
Kubo et al.

(10) Patent No.: US 10,638,492 B2
(45) Date of Patent: Apr. 28, 2020

(54) RADIO COMMUNICATION SYSTEM AND BASE STATION

(71) Applicant: NTT DOCOMO, INC., Tokyo (JP)

(72) Inventors: Takahiro Kubo, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/082,579

(22) PCT Filed: Mar. 8, 2017

(86) PCT No.: PCT/JP2017/009191
§ 371 (c)(1),
(2) Date: Sep. 6, 2018

(87) PCT Pub. No.: WO2017/154966
PCT Pub. Date: Sep. 14, 2017

(65) Prior Publication Data
US 2019/0098639 A1 Mar. 28, 2019

(30) Foreign Application Priority Data

Mar. 11, 2016 (JP) .................................. 2016-048748

(51) Int. Cl.
H04W 4/00 (2018.01)
H04W 72/08 (2009.01)
(Continued)

(52) U.S. Cl.
CPC ............ H04W 72/085 (2013.01); H04B 7/04 (2013.01); H04B 7/0413 (2013.01); H04W 88/08 (2013.01); H04W 92/04 (2013.01)

(58) Field of Classification Search
CPC ... H04W 72/085; H04W 92/04; H04W 88/08; H04W 7/04; H04W 7/0413
(Continued)

(56) References Cited

U.S. PATENT DOCUMENTS 8,515,410 B1 * 8/2013 Bach ................. H04W 52/0206
455/418
9,467,993 B2 * 10/2016 Seo ..................... H04W 72/042
(Continued)

FOREIGN PATENT DOCUMENTS

EP 2237623 A1 * 10/2010 ............ H04W 48/20
EP 2785139 A1 10/2014
(Continued)

OTHER PUBLICATIONS

Extended European Search Report issued in corresponding European Application No. 17763306.2, dated Jan. 7, 2019 (8 pages).
(Continued)

Primary Examiner — Thai D Hoang
(74) Attorney, Agent, or Firm — Osha Liang LLP

(57) ABSTRACT

A radio communication system includes a first base station, a second base station, a third base station, and a user equipment, wherein the radio communication system includes a determination unit that determines allocation of signal processing that is commonly performed by the first base station and the second base station and signal processing that is performed by the third base station, based on a predetermined reference value; a first signal processor that performs the signal processing allocated to the first base station in accordance with the allocation determined by the determination unit; a second signal processor that performs the signal processing allocated to the second base station in accordance with the allocation determined by the determination unit; and a third signal processor that performs the signal processing allocated to the third base station in accordance with the allocation determined by the determination unit.

6 Claims, 15 Drawing Sheets

(51) Int. Cl.
*H04B 7/0413* (2017.01)
*H04W 92/04* (2009.01)
*H04W 88/08* (2009.01)
*H04B 7/04* (2017.01)

(58) Field of Classification Search
USPC ............... 370/329–330, 335–345, 347–348, 370/522–527
See application file for complete search history.

(56) References Cited

U.S. PATENT DOCUMENTS

| | | | |
|---|---|---|---|
| 9,538,410 B2* | 1/2017 | Park | H04B 7/2643 |
| 9,961,688 B1* | 5/2018 | Anvari | H04L 47/193 |
| 2013/0070688 A1* | 3/2013 | Picker | H04W 88/08 370/329 |
| 2013/0070742 A1* | 3/2013 | Picker | H04W 28/0247 370/338 |
| 2014/0226481 A1 | 8/2014 | Dahod et al. | |
| 2014/0226736 A1 | 8/2014 | Niu et al. | |
| 2015/0029965 A1 | 1/2015 | Aminaka et al. | |
| 2017/0156142 A1* | 6/2017 | Sato | H04W 88/08 |
| 2018/0287674 A1* | 10/2018 | Kloper | H04B 7/0452 |
| 2019/0036737 A1* | 1/2019 | Kloper | H04L 12/64 |
| 2019/0109660 A1* | 4/2019 | Akins, III | H04J 3/0638 |

FOREIGN PATENT DOCUMENTS

| | | |
|---|---|---|
| JP | 2011-061728 A | 3/2011 |
| JP | 2012004874 A | 1/2012 |
| JP | 2013-058902 A | 3/2013 |
| JP | 2013-093796 A | 5/2013 |
| WO | 2013/076900 A1 | 5/2013 |

OTHER PUBLICATIONS

Office Action issued in the counterpart Japanese Patent Application No. 2016048748, dated Jul. 2, 2019 (5 pages).
International Search Report issued in PCT/JP2017/009191 dated May 16, 2017 (5 pages).
Written Opinion of the International Searching Authority issued in PCT/JP2017/009191 dated May 16, 2017 (5 pages).
"Docomo 5G white paper", Sep. 2014, NTT Docomo, Internet URL: https://www.nttdocomo.co.jp/corporate/technology/whitepaper_5g/ (27 pages).

* cited by examiner

RADIO COMMUNICATION SYSTEM AND BASE STATION

TECHNICAL FIELD

An aspect of the present disclosure relates to a radio communication system and a base station.

BACKGROUND ART

In a radio communication system of Long Term Evolution (LTE) and LTE-Advanced (LTE-A), there is known a technology called a centralized radio access network (C-RAN) capable of accommodating a plurality of cells while suppressing a device cost so as to efficiently support an area such as a high-traffic hot spot.

The C-RAN is formed of one or a plurality of remote antenna units (RAUs) which are remote installation type base stations (slave station), and a baseband unit (BBU) that is a base station (master station) that concentrically controls the RAU. The BBU has a function of Layer 1 to Layer 3 which are provided to the base station. A digital baseband signal, which is generated in the BBU, is transmitted to the RAU, and is transmitted from a radio frequency (RF) function unit provided to the RAU.

A network line that connects the BBU and the RAU is called a front haul (FH), and a common public radio interface (CPRI) is used as the FH in the LTE.

RELATED-ART DOCUMENT

Non-Patent Document

Non-Patent Document 1: "Docomo 5G white paper", September, 2014, NTT Docomo, Internet URL: https://www.nttdocomo.co.jp/corporate/technology/whitepaper_5g/

SUMMARY OF THE INVENTION

Problems to be Solved by the Invention

In the current LTE, the functions of Layer 1 (physical layer: L1), Layer 2 (MAC, RLC, PDCP), and Layer 3 (RRC) are implemented on a BBU side. Accordingly, a band, which is necessary for the FH in the case of using 2×2 multiple input multiple output (MIMO), is approximately 16 times greater than a peak rate that is supported in the BBU. For example, as illustrated in FIG. 1, in a case where a system band is 20 MHz, and the BBU supports a radio communication (maximum: 150 Mbps) of 2×2 MIMO, a band necessary for the CPRI is approximately 2.5 Gbps. In addition, in this configuration, the band necessary for the CPRI increments in proportion to an increase in the number of antennas and the system band.

When 5G, which has been currently studied, is introduced, the band necessary for the FH significantly increases in accordance with an improvement in a peak rate. In the case of realizing a peak rate of 10 Gbps, the band necessary for the CPRI is several hundreds of Gbps or greater, and thus it is difficult to cope with a current CPRI standard (maximum: 24.33 Gbps).

Here, an examination has been conducted to reduce a transmission amount through the FH by realizing a part of the layers mounted in the BBU on an RAU side. Various variations have been studied with respect to function sharing between the BBU and RAU. As an example thereof, a plan in which the entirety of a plurality of kinds of processing of Layer 1 are implemented in RAU, and processing of Layer 2 or higher is implemented in the BBU, a plan in which a part of the processing of Layer 1 is implemented on the RAU side, the remaining processing of Layer 1 and the processing of Layer 2 or higher are implemented on the BBU side, and the like have been studied.

In addition, application of a network such as a passive optical network (PON) in which one optical fiber is shared by multiple nodes and Ethernet (registered trademark) to the FH has been studied (FIG. 2) to implement the FH that is cheaper than the CPRI. The networks are shared by the multiple nodes, and thus it is considered that a control of a transmission amount through the FH is necessary in correspondence with a variation of a signal quantity between the nodes.

In addition, it is assumed that processing capability of the RAU is relatively lower than that of the BBU. Accordingly, when simply reducing the transmission amount of the FH, a processing load of the RAU tends to increase. Accordingly, there is a need for a structure capable of appropriately changing the function sharing between the BBU and the RAU in correspondence with a situation in consideration of the processing load of the RAU, communication quality with a user equipment, and the like.

A disclosed technology has been made in consideration of the above-described situations, and an object thereof is to provide a technology capable of appropriately changing function sharing between a BBU and an RAU in a radio communication network according to a C-RAN.

Means for Solving the Problems

According to an aspect of the present disclosure, there is provided a radio communication system including a first base station, a second base station, a third base station that performs a communication with the first base station and the second base station, and a user equipment that performs a communication with the first base station and the second base station. The radio communication system includes a determination unit that determines allocation of signal processing that is commonly performed by the first base station and the second base station and signal processing that is performed by the third base station, based on a predetermined reference value; a first signal processor that performs the signal processing allocated to the first base station in accordance with the allocation that is determined by the determination unit; a second signal processor that performs the signal processing allocated to the second base station in accordance with the allocation that is determined by the determination unit; and a third signal processor that performs the signal processing allocated to the third base station in accordance with the allocation that is determined by the determination unit.

Effect of the Invention

According to an aspect of the present disclosure, a technology is provided that is capable of appropriately changing function sharing between a BBU and an RAU in a radio communication network according to a C-RAN.

MODES FOR CARRYING OUT THE INVENTION

Hereinafter, an embodiment of the invention is described by referring to the accompanying drawings. Note that, the following embodiment is illustrative only, and an embodiment to which the invention is applicable is not limited to the following embodiment. For example, in a radio communication system according to this embodiment, a system of a method in conformity to an LTE or 5G is assumed, but the invention is applicable to other methods without limitation to the LTE or 5G. Furthermore, in this specification and claims, "LTE" is used in wide meaning including not only a communication method corresponding to Release 8 or 9 of 3GPP but also a corresponding fifth generation communication method subsequently to Release 10, 11, 12, 13, or 14 of 3GPP.

<System Configuration>

Figure 1:
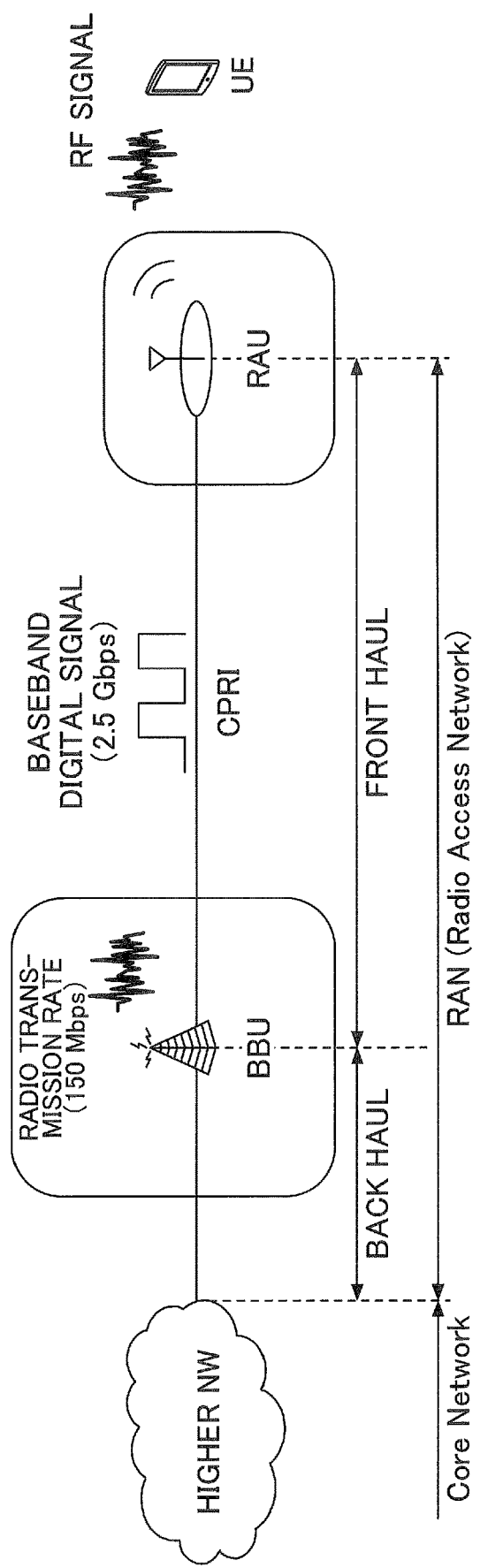
FIG. 1 is a view illustrating a band necessary for an FH.
Figure 2:
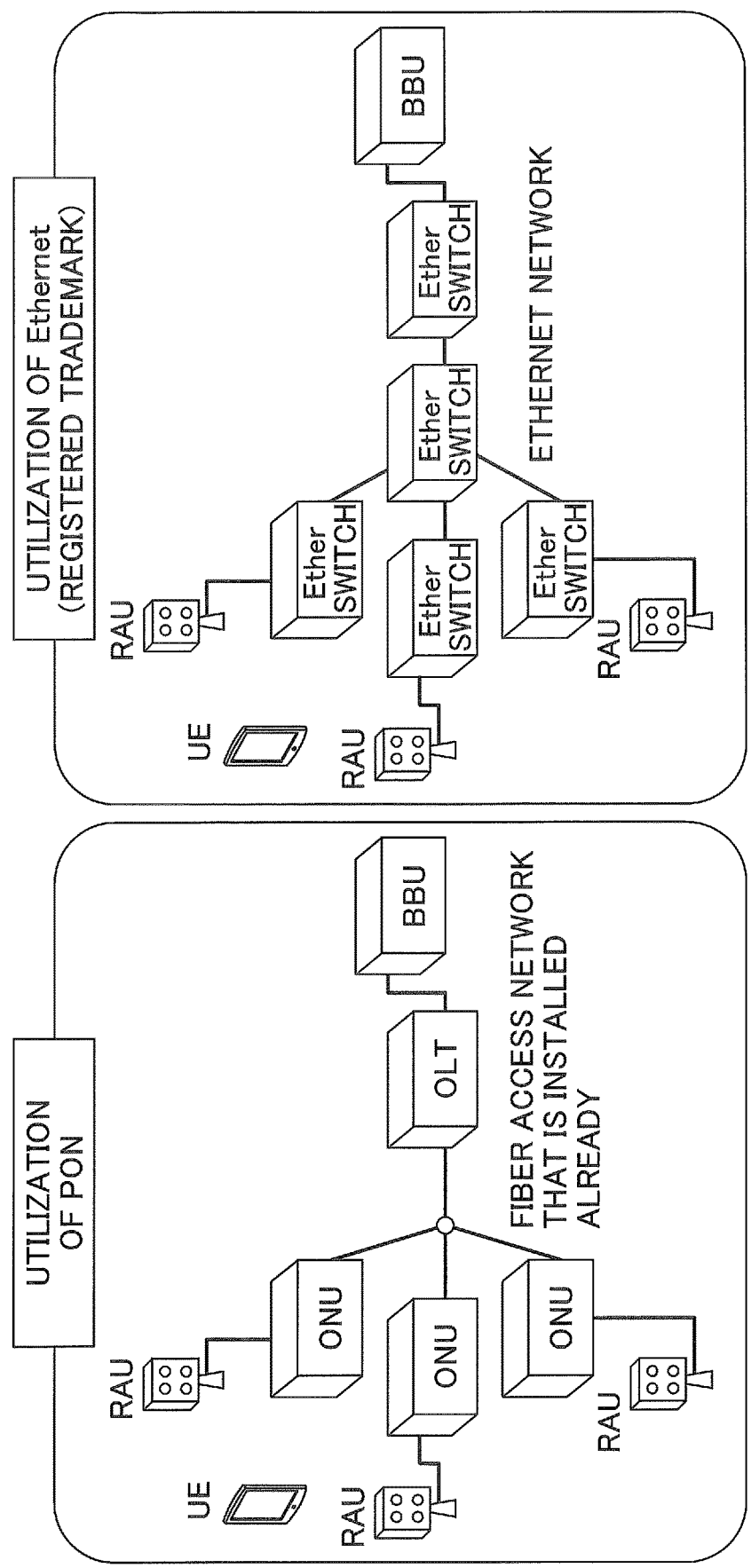
FIG. 2 is a view illustrating an example of a network whose use for FH is being considered.
Figure 3:
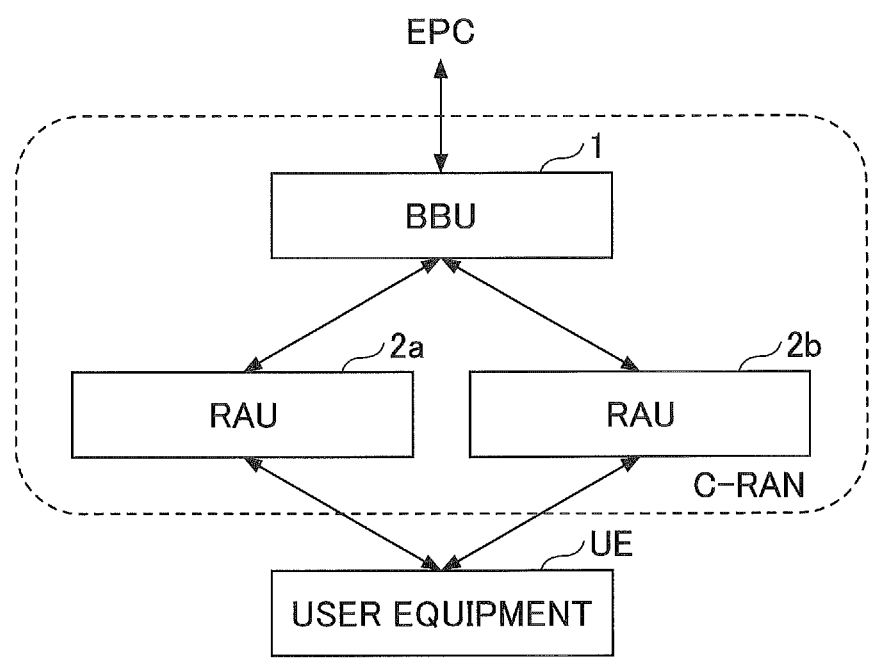
FIG. 3 is a view illustrating a system configuration example of a radio communication system according to an embodiment.

FIG. 3 is a view illustrating a system configuration example of the radio communication system according to the embodiment. As illustrated in FIG. 3, the radio communication system according to this embodiment includes a BBU 1, an RAU 2a, an RAU 2b, and a user equipment UE. In the following description, in the case of not discriminating the RAU 2a and the RAU 2b, the RAU 2a and the RAU 2b will be described as "RAU 2". In FIG. 3 the RAU 2a and the RAU 2b are illustrated, but three or greater of RAUs 2 may be included.

The BBU 1 may be referred to as an aggregate base station, a master station, or a base station (enhanced Node B (eNB)) in a simple manner. The RAU 2 may be referred to as a satellite base station, a slave station, or a base station in a simple manner. The BBU 1 and the RAU 2 transmits and receives a predetermined signal through an FH.

In addition, the BBU 1 performs a control so that the RAU 2a and the RAU 2b transmits (cooperatively transmits) a DL signal to a user equipment UE in cooperation with each other. Similarly, the BBU 1 performs a control so that composition, selection, and the like of a UL signal, which is received from each of the RAU 2a and the RAU 2b, are performed to receive (cooperatively receive) the UL signal from the user equipment UE on the BBU 1 side in a cooperative manner.

<Function Sharing between BBU and RAU>

Figure 4A:
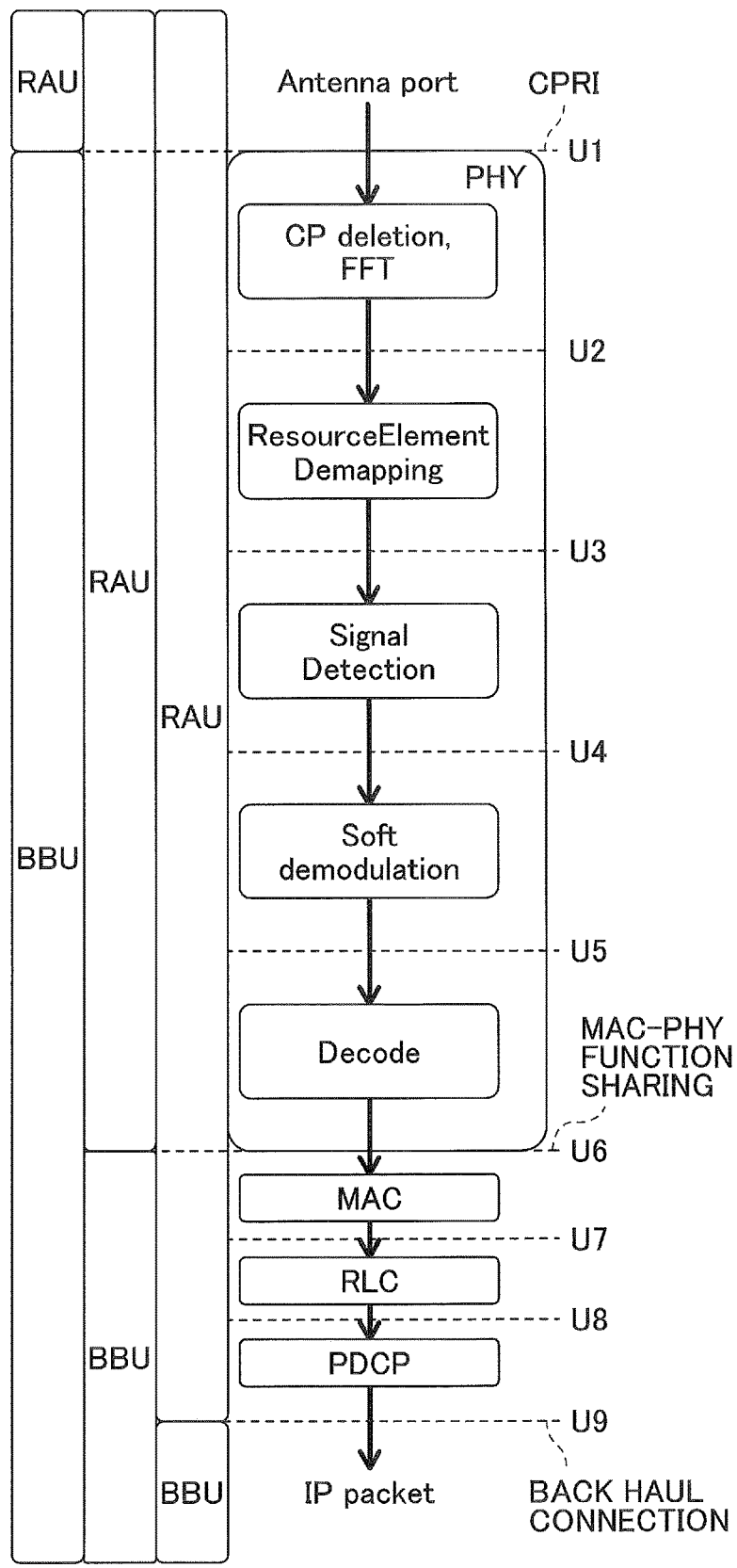
FIG. 4A is a view illustrating a function sharing example between a BBU and an RAU in a UL.
Figure 4B:
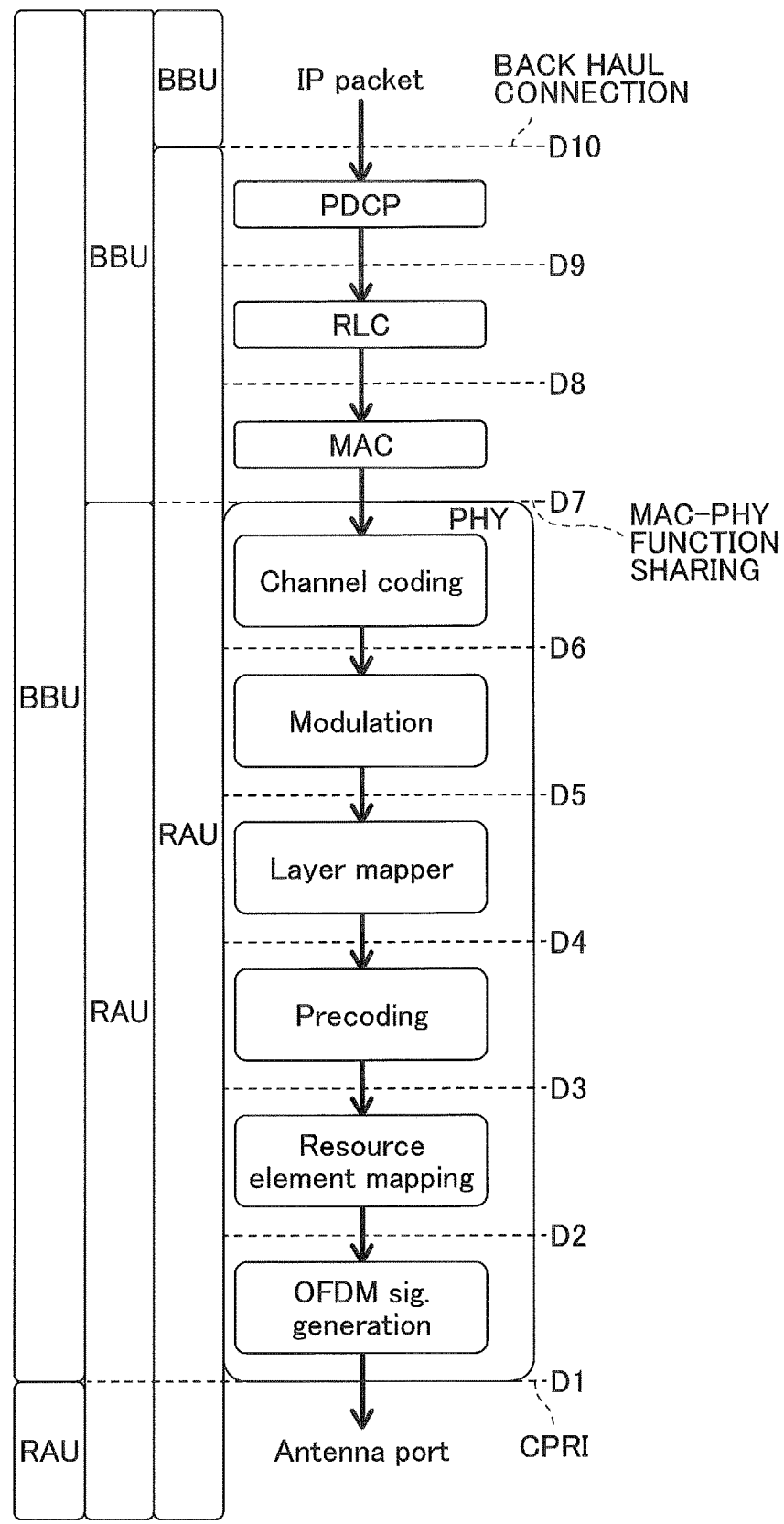
FIG. 4B is a view illustrating a function sharing example between a BBU and an RAU in a DL.

FIGS. 4A and 4B are views illustrating a function sharing example between a BBU and an RAU. FIG. 4A illustrates a function sharing example in a UL, and FIG. 4B illustrates a function sharing example in a DL. Boundaries "U1" to "U9" in FIG. 4A represent boundaries of a plurality of kinds of processing of UL which are respectively performed in the BBU 1 and the RAU 2. For example, in the case of function sharing in the boundary "U6", processing according to a function of Layer 2 or higher is performed on a BBU 1 side, and processing according to a function of Layer 1 is performed on an RAU 2 side. Furthermore, for example, in the case of function sharing at the boundary "U2", among a plurality of kinds of processing according to the function of Layer 1, processing up to an FFT is performed on the RAU 2 side, and processing subsequent to resource demapping (resource element demapping) is performed on the BBU 1 side. The boundary "U1" corresponds to a configuration of connecting the BBU 1 and the RAU 2 by using a CPRI. Furthermore, in a case where a communication by an MIMO is not performed in the UL, signal detection processing is omitted.

Similarly, boundaries "D1" to "D10" in FIG. 4B represent boundaries of a plurality of kinds of processing of the DL which are respectively performed in the BBU 1 and the RAU 2. For example, in the case of function sharing at the boundary "D7", processing according to the function of Layer 2 or higher is performed on the BBU 1 side, and processing according to the function of Layer 1 is performed on the RAU 2 side. In addition, for example, in the case of function sharing at the boundary "D2", among the plurality of kinds of processing according to the function of Layer 1, processing up to resource element mapping is performed on the BBU 1 side, and OFDM signal generation is performed on the RAU 2 side. The boundary "D1" corresponds to a configuration of connecting the BBU 1 and the RAU 2 by using the CPRI. Furthermore, in a case where a communication by the MIMO is not performed in the DL, processing layer mapper and processing of precoding are not performed.

The BBU 1, the RAU 2a, and the RAU 2b according to this embodiment are capable of arbitrarily changing that the function sharing is to be made (signal processing is to be shared) at which boundary among boundaries "U1" to "U9" in an UL. Similarly, the BBU 1, the RAU 2a, and the RAU 2b according to this embodiment are capable of arbitrarily changing that the function sharing is to be made (signal processing is to be shared) at which boundary among boundaries "D1" to "D10" in a DL. Furthermore, the BBU 1, the RAU 2a, and the RAU 2b according to this embodiment may be configured to commonly change the function sharing in a unit of the RAU 2a and the RAU 2b (in other words, the same function sharing may be allowed to be made in the RAU 2a and the RAU 2b), or to commonly change the function sharing in a unit of the user equipment UE (in other words, the same function sharing may be allowed to be made with respect to the same user equipment UE). In addition, the function sharing may be changed independently in the UL and the DL.

<Procedure>

(Switching of Function Sharing in UL)

Figure 5:
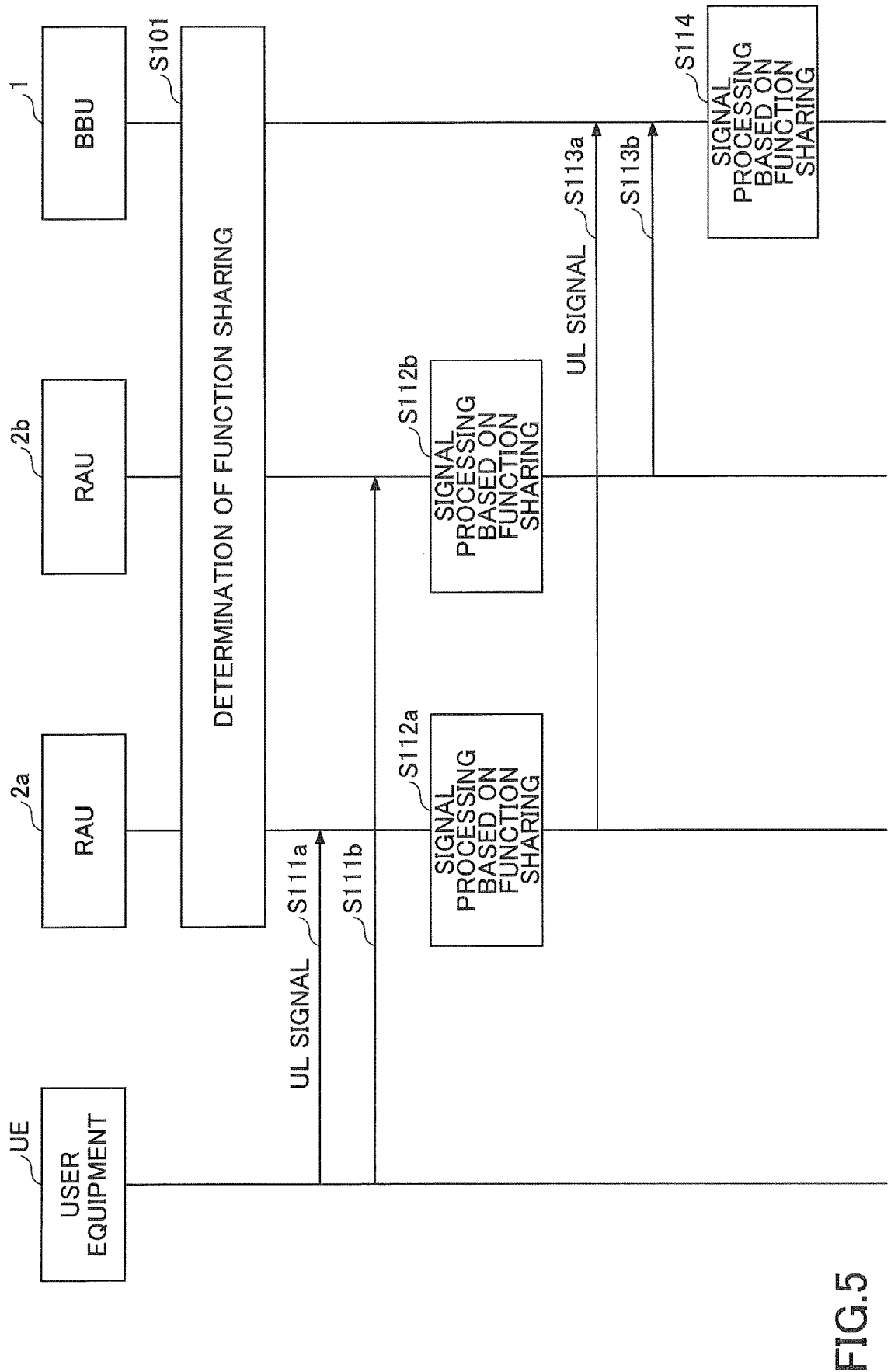
FIG. 5 is a sequence diagram illustrating an example of a procedure when changing the function sharing in the UL.

FIG. 5 is a sequence diagram illustrating an example of a procedure for switching function sharing in the UL.

In step S101, the BBU 1 or the RAU 2 determine sharing (determine function sharing) between signal processing performed by the BBU 1 and signal processing performed by the RAU 2 (signal processing that is commonly performed by the RAU 2a and the RAU 2b). In this embodiment, the boundaries ("U1" to "U9") of the function sharing between the BBU 1 and the RAU 2 may be determined in the BBU 1 or the RAU 2.

More specifically, the BBU 1 or the RAU 2 determines allocation of signal processing performed by the RAU 2 and signal processing performed by the BBU 1 on the basis of a predetermined reference value. For example, a table, in which a range of a predetermined reference value and the boundaries "U1" to "U9" in the UL are correlated one-to-one, is retained in the BBU 1 or the RAU 2. The BBU 1 or the RAU 2 may determine allocation of the signal processing performed by the RAU 2 and the signal processing performed by the BBU 1 by comparing the table and the predetermined reference value with each other. In addition, a predetermined threshold value may be retained in the BBU 1 or the RAU 2, and the BBU 1 or the RAU 2 may determine that the function sharing is to be made at which boundary among the boundaries "U1" to "U9" through determination of whether or not the predetermined reference value is equal to or greater than the predetermined threshold value. Acquisition (measurement) of the predetermined reference value may be performed by the BBU 1 or the RAU 2. The BBU 1 or the RAU 2 may notify a counterpart (the RAU 2 or the BBU 1) of an acquisition result (or measurement result) as necessary. A specific example of the predetermined reference value will be described later.

The BBU 1 or the RAU 2 notifies a counterpart (the RAU 2 or the BBU 1) of the determination result of the function sharing. Furthermore, in a case where the RAU 2 makes a determination of the function sharing, the notification of the determination result of the function sharing is made between the RAU 2a and the RAU 2b. In addition, in a case where the RAU 2 makes a determination of the function sharing, the RAU 2a and the RAU 2b may apply an identifier, which indicates that signal processing according to which function has been performed on the RAU 2a side or on the RAU 2b side, to header information of a UL signal that is transmitted in a procedure in step S113a and step S113b to be described later. According to this, the function sharing of the UL can be changed in a dynamic manner.

In step S111a, the RAU 2a receives an UL signal that is transmitted from the user equipment UE. Similarly, in step S11b, the RAU 2b receives an UL signal that is transmitted from the user equipment UE. Subsequently, the RAU 2a performs signal processing to be performed by the RAU 2a (S112a), and transmits a signal after being subjected to the signal processing to the BBU 1 (S113a). Similarly, the RAU 2b performs signal processing to be performed by the RAU 2b (S112b), and transmits a signal after being subjected to the signal processing to the BBU 1 (S113b).

In step S114, the BBU 1 performs signal processing to be performed by the BBU 1 (S114). Here, the BBU 1 performs cooperative reception by using the UL signal transmitted from the RAU 2a and the UL signal transmitted from the RAU 2b. A method of performing the cooperative reception may be any method. For example, the BBU 1 may select a UL signal from any one side among UL signals received from the RAU 2a and UL signals received from the RAU 2b, or may combine and receive the UL signals from the both sides. In addition, in the case of selecting a UL signal from any one side, the BBU 1 may measure reception quality (SNR, SINR, and the like) of the UL signals from the RAU 2a and the RAU 2b to select a UL signal in which reception quality of the UL signal is satisfactory.

Furthermore, the procedure in step S101 to S114 described above may be repetitively performed with a predetermined interval. According to this, for example, the function sharing of the UL can be switched in a dynamic manner on the basis of a variation in reception quality of the UL signal or a DL signal, a variation in a processing load of the RAU 2, and the like.

(Switching of Function Sharing in DL)

Figure 6:
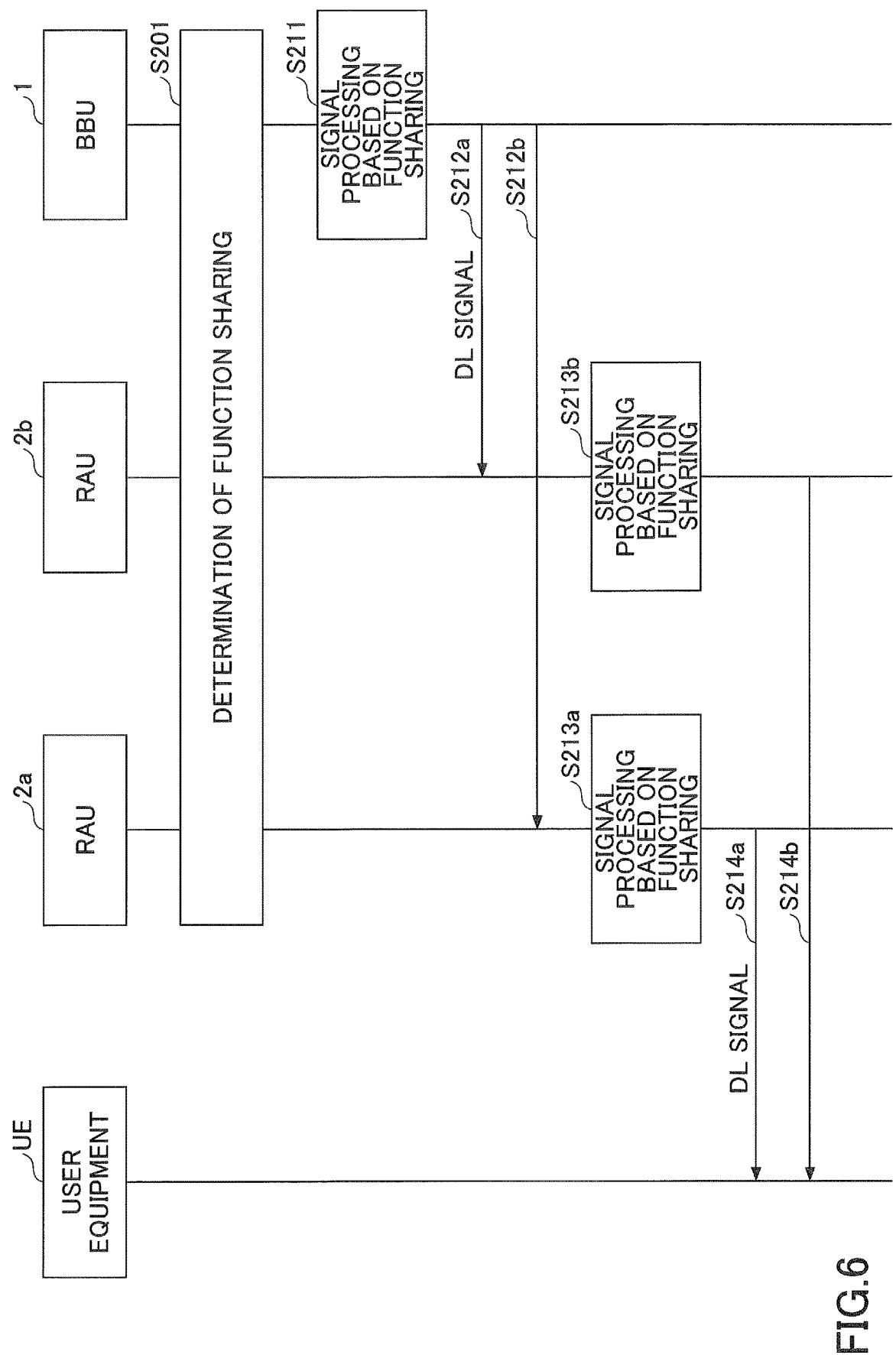
FIG. 6 is a sequence diagram illustrating an example of a procedure when changing the function sharing in the DL.

FIG. 6 is a sequence diagram illustrating an example of a procedure for switching function sharing in the DL. Furthermore, in this embodiment, the boundaries "D1" to "D10" of function sharing between the BBU 1 and the RAU 2 may be determined in the BBU 1 or the RAU 2.

In step S201, the BBU 1 or the RAU 2 determines sharing (determines function sharing) between signal processing performed by the BBU 1 and signal processing performed by the RAU 2 (signal processing that is commonly performed by the RAU 2a and RAU 2b). In this embodiment, the boundaries ("D1" to "D10") of the function sharing between the BBU 1 and the RAU 2 may be determined in the BBU 1 or the RAU 2.

More specifically, the BBU 1 or the RAU 2 determines allocation of signal processing performed by the RAU 2 and signal processing performed by the BBU 1 on the basis of a predetermined reference value. For example, a table, in which a range of a predetermined reference value and the boundaries "D1" to "D10" in the DL are correlated one-to-one, is retained in the BBU 1 or the RAU 2. The BBU 1 or the RAU 2 may determine allocation of the signal processing performed by the RAU 2 and the signal processing performed by the BBU 1 by comparing the table and the predetermined reference value with each other. In addition, a predetermined threshold value may be retained in the BBU 1 or the RAU 2, and the BBU 1 or the RAU 2 may determine that the function sharing is to be made at which boundary among the boundaries "D1" to "D10" through determination of whether or not the predetermined reference value is equal to or greater than the predetermined threshold value. Acquisition (measurement) of the predetermined reference value may be performed by the BBU 1 or the RAU 2. The BBU 1 or the RAU 2 may notify a counterpart (the RAU 2 or the BBU 1) of an acquisition result (or measurement result) as necessary.

The BBU 1 or the RAU 2 notifies a counterpart (the RAU 2 or the BBU 1) of the determination result of the function sharing. Furthermore, in a case where the RAU 2 determines the function sharing, the determination may be made by both of the RAU 2a and the RAU 2b or the determination may be made by any one of the RAU 2a and the RAU 2b, and a counterpart (the RAU 2b or the RAU 2a) may be notified of the determination result. In addition, in a case where the BBU 1 determines the function sharing, the BBU 1 may apply an identifier, which indicates that signal processing according to which function has been performed on the BBU 1 side, to header information of a DL signal that is transmitted in a procedure of step S211 to be described later. According to this, the function sharing of the DL can be switched in a dynamic manner.

The BBU 1 performs signal processing to be performed by the BBU 1 with respect to a DL signal to be transmitted to the user equipment UE (S211), and transmits the DL signal after being subjected to the signal processing to the RAU 2a and the RAU 2b (S212a, S212b). Here, the BBU 1 performs a control so that the RAU 2a and the RAU 2b transmit (cooperatively transmit) the DL signal to the user equipment UE in cooperation with each other in a procedure of step S211. For example, the BBU 1 may be allowed to transmit a signal that is generated to both of the RAU 2*a* and the RAU 2*b*, or may be allowed to transmit the DL signal to any one of the RAU 2*a* and the RAU 2*b*. In a case where any one of the RAU 2*a* and the RAU 2*b* is selected, reception quality of the DL signal between the user equipment UE and the RAU 2*a* and reception quality of the DL signal between the user equipment UE and the RAU 2*b* may be allowed to be fed back from the user equipment UE to the BBU 1, and the BBU 1 may allowed to select the RAU 2 in which the reception quality is satisfactory. In addition, the BBU 1 may allow the user equipment UE to feed back a DL signal propagation state (for example, channel information and the like) between the user equipment UE and the RAU 2*a* and the RAU 2*b* to the BBU 1, and the BBU 1 may be allowed to generate a DL signal to be transmitted to the RAU 2*a* and a DL signal to be transmitted to the RAU 2*b* on the basis of the propagation state that is fed back and may be allowed to transmit the DL signals which are generated to the RAU 2*a* and the RAU 2*b*, respectively.

Subsequently, the RAU 2*a* and the RAU 2*b* respectively perform signal processing to be performed by the RAU 2*a* or the RAU 2*b* on the basis of function sharing (S213*a*, S213*b*), and respectively transmit DL signals after being subjected to the signal processing to the user equipment UE (S214*a*, S214*b*).

Furthermore, the procedure of step S201 to S214 described above may be repetitively performed with a predetermined interval. According to this, for example, the function sharing of the DL can be changed in a dynamic manner on the basis of a variation in reception quality of the UL signal or the DL signal, a variation in a processing load of the RAU 2, and the like.

(Example of Predetermined Reference Value)

For example, the predetermined reference value may be a value of a signal to interference plus noise power ratio (SINR) or a signal to noise ratio (SNR) of the UL signal received from the user equipment UE or the DL signal that is received by a user equipment UE. As a table in which a range of the SINR or the SNR and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which the range of the SINR or the SNR is great, may be used. That is, as the SINR or the SNR becomes greater, the number of processing performed on the RAU 2 side may be set to increase. In addition, as another example, in a case where the SINR or the SNR is equal to or greater than a predetermined threshold value, the function sharing may be divided at a predetermined boundary in the UL or the DL (for example, the function sharing may be divided at "U6", "D7", and the like), and in a case where the SINR or the SNR is less than the predetermined threshold value, the function sharing may be divided at a predetermined boundary (for example, "U2", "D2", and the like) in the UL or the DL.

Acquisition (measurement) of the SINR or the SNR may be performed in the RAU 2 or the BBU 1. In addition, in a case where the measurement is performed in the RAU 2, a side, in which an SINR or an SNR which is measured in the RAU 2*a* and an SINR or an SNR which is measured in the RAU 2*b* is greater, may be selected and used. In addition, in a case where the function sharing is changed for each user equipment UE, the RAU 2 or the BBU 1 may acquire (measure) the SINR or the SNR for each user equipment UE on the basis of series of a reference signal or a resource position allocated to the user equipment UE. In this case, the RAU 2 may be notified of the series of the reference signal or the resource position allocated to the user equipment UE from the BBU 1 in advance. In addition, in the case of changing the function sharing for unit of the RAU 2, for example, the changing of the function sharing per unit of the RAU 2 may be implemented by dividing scheduling time of a radio resource of the DL or UL for each user equipment UE.

In addition, the predetermined reference value may be a cyclic redundancy check (CRC) check success rate of the UL signal that is received from the user equipment UE or the DL signal that is received by the user equipment UE. The CRC check success rate represents a probability of determination as being correct in the CRC that is included in a radio signal transmitted with a predetermined physical channel. In a case where radio quality between the user equipment UE and the RAU 2 deteriorates, the CRC check success rate decreases.

As a table in which a range of the CRC check success rate and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which a range of the CRC check success rate is high, may be used. That is, as the CRC check success rate is high, the number of processing performed on the RAU 2 side may be set to increase. In addition, as another example, in a case where the CRC check success rate is equal to or greater than a predetermined threshold value, the function sharing may be divided at a predetermined boundary in the UL or the DL (for example, the function sharing may be divided at "U6", "D7", and the like), and in a case where the CRC check success rate is less than the predetermine threshold value, the function sharing may be divided at a predetermined boundary (for example, "U2", "D2", and the like) in the UL or the DL.

Acquisition (measurement) of the CRC check success rate may be performed by the RAU 2 or the BBU 1. In addition, in a case where the measurement is performed by the RAU 2, a side, in which a CRC check success rate measured by the RAU 2*a* and a CRC check success rate measured by the RAU 2*b* is greater, may be selected and used. Furthermore, the CRC check is performed when performing decoding processing, and thus it is preferable that a device (BBU 1 or RAU 2), which performs processing according to the decoding, performs acquisition of the CRC check success rate.

In addition, the predetermined reference value may be the number of retransmission times of the UL signal or the DL signal from the user equipment UE in a predetermined period (or an average value of the number of retransmission times in the predetermined period). For example, the number of retransmission times of the DL signal to the user equipment UE in a predetermined period may be counted as the number of notification times of NAK by a PUCCH or a PUSCH.

As a table in which a range of the number of retransmission times and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which a range of the number of retransmission times is small, may be used. That is, as the number of retransmission times is small, processing performed on the RAU 2 side may be set to increase. In addition, as another example, in a case where the number of retransmission times is less than a predetermined threshold value, the function sharing may be divided at a predetermined boundary (for example, "U6", "D7", and the like) in the UL or the DL, and in a case where the number of retransmission times is equal to or greater than the predetermined threshold value, the function sharing may be divided at a predetermined boundary (for example, "U2", "D2", and the like) in the UL or the DL.

Acquisition (measurement) of the number of retransmission times may be performed in the RAU 2 or the BBU 1. In addition, the measurement is performed by the RAU 2, an average value of the number of measurement times in the RAU 2a and the number of measurement times in the RAU 2b may be used, and a side, in which the number of measurement times is greater, may be selected and used. Furthermore, reception of the NAK is performed with a signal after being decoded, and thus it is preferable that the acquisition of the number of retransmission times is performed by a device (the BBU 1, the RAU 2a, or the RAU 2b) that performs processing in accordance with decoding.

In addition, the predetermined reference value may be a channel estimation error of the UL signal that is received from the user equipment UE or the DL signal that is received by the user equipment UE. The channel estimation error represents an index indicating that a variation (dispersion) occurs to a certain extent between an average value of results obtained by performing channel estimation by using a plurality of reference signals included in the UL signal that is received from the user equipment UE or the DL signal which the user equipment UE receives, and a result obtained by performing channel estimation of each of the reference signals. In a case where radio quality between the user equipment UE and the RAU 2 deteriorates, the channel estimation error increases.

As a table in which a range of the channel estimation error and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which a range of the channel estimation error is small, may be used. That is, as the range of the channel estimation error is small, processing performed on the RAU 2 side may be set to increase. In addition, as another example, in a case where the channel estimation error is less than a predetermined threshold value, the function sharing may be divided at a predetermined boundary (for example, "U6", "D7", and the like) in the UL or the DL, and in a case where the channel estimation error is equal to or greater than the predetermined threshold value, the function sharing may be divided at a predetermined boundary (for example, "U2", "D2", and the like) in the UL or the DL.

In addition, the predetermined reference value may be the magnitude of a processing load of the RAU 2 (a processor utilization rate, a memory utilization rate, the amount of data between the BBU 1 and the RAU 2, and the like). With regard to the magnitude of the processing load of the RAU 2, a processing load of the RAU 2, which is the greatest between a processing load of the RAU 2a and a processing load of the RAU 2b, may be used. As a table in which a range of the magnitude of the processing load of the RAU 2 and the boundaries in the UL or the DL are correlated with each other, for example, a table, in which correlation of (boundaries "U1", "U2", "U3", "U4", "U5", "U6", "U7", "U8", and "U9") or (boundaries "D1", "D2", "D3", "D4", "D5", "D6", "D7", "D8", "D9", and "D10") is made in the order from a side in which a range of the processing load of the RAU 2 is great, may be used. That is, as the processing load of the RAU 2 is great, processing of Layer 1, which is performed on the RAU 2 side, is set to decrease. In addition, as another example, in a case where the magnitude of the processing load of the RAU 2 is less than a predetermined threshold value, the function sharing may be divided at a predetermined boundary (for example, "U6", "D7", and the like) in the UL or the DL, and in a case where the magnitude of the processing load is equal to or greater than the predetermined threshold value, the function sharing may be divided at a predetermined boundary (for example, "U2", "D2", and the like) in the UL or the DL.

The processing load of the RAU 2 may be measured by the RAU 2a and/or the RAU 2b, or may be estimated by the BBU 1 on the basis of the amount of data transmitted to the RAU 2a and/or the RAU 2b from the BBU 1, the amount of data that is scheduled by the BBU 1 with respect to the RAU 2a and/or the RAU 2b, and the like.

In addition, the predetermined reference value may relate to whether or not at least one of the number of antennas provided to the RAU 2a and the number of antennas provided to the RAU 2b is equal to or greater than the number of antennas provided to the user equipment UE. For example, in a case where at least one of the number of antennas provided to the RAU 2a and the number of antennas provided to the RAU 2b is equal to or greater than the number of antennas provided to the user equipment UE, reception of the UL signal by using the MIMO is possible even in the RAU 2, and thus the function sharing may be made at a predetermined boundary (for example, "U6" and the like in the UL. In contrast, in a case where the number of antennas provided to each of the RAU 2a and the RAU 2b is smaller than the number of antennas provided to the user equipment UE, it is determined that it is necessary to perform reception of the UL signal by using the MIMO on the BBU 1 side, and the function sharing may be made at a predetermined boundary (for example, "U2" and the like).

Note that the number of the antennas included in the user equipment UE may be reported from the user equipment UE to the BBU1 by a higher layer, etc.

(Operation Example of a Process of Switching Function Sharing in UL)

Figure 7A:
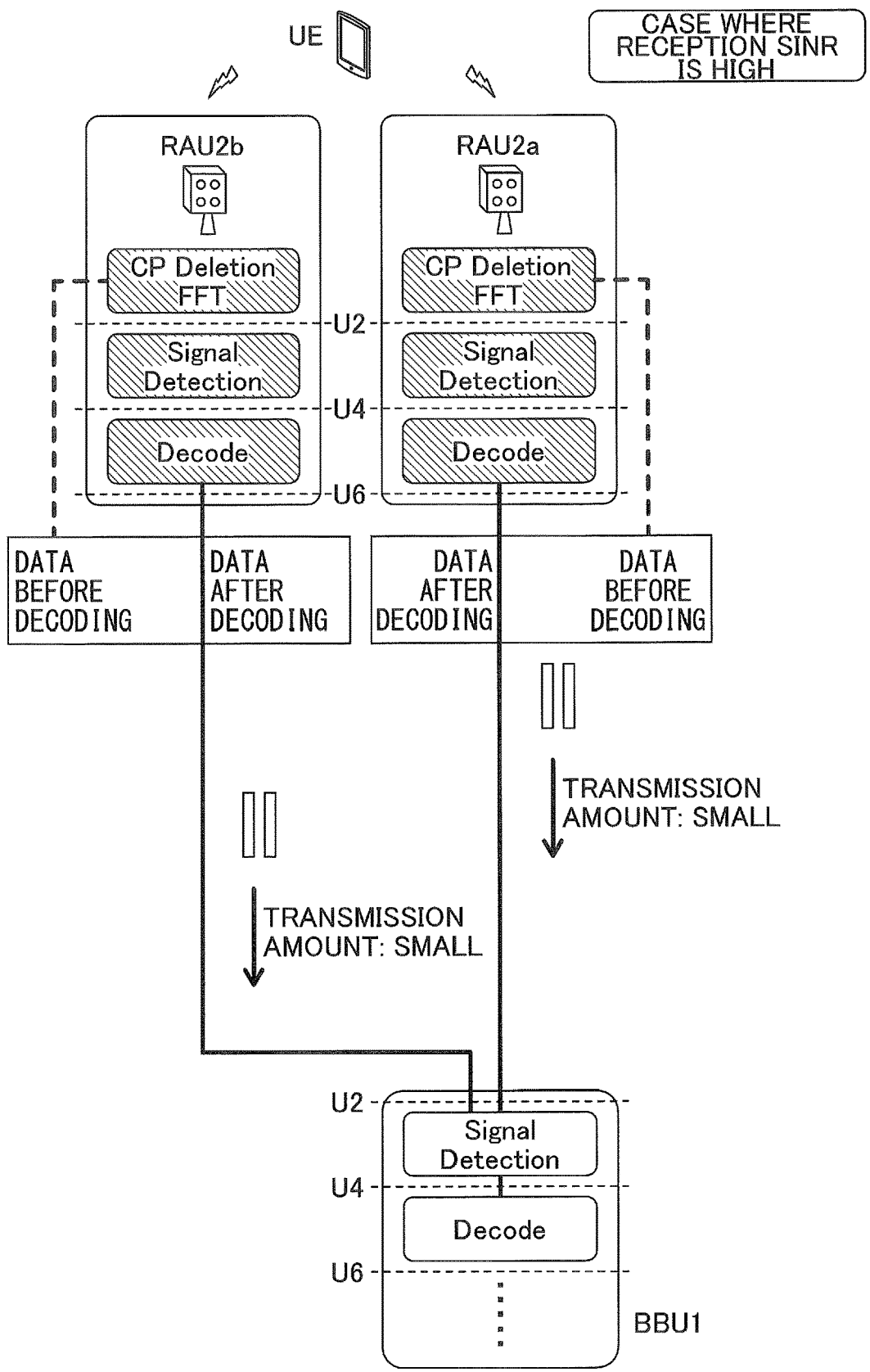
FIG. 7A is a view illustrating an operation example of a process for switching a functional share in the UL.
Figure 7B:
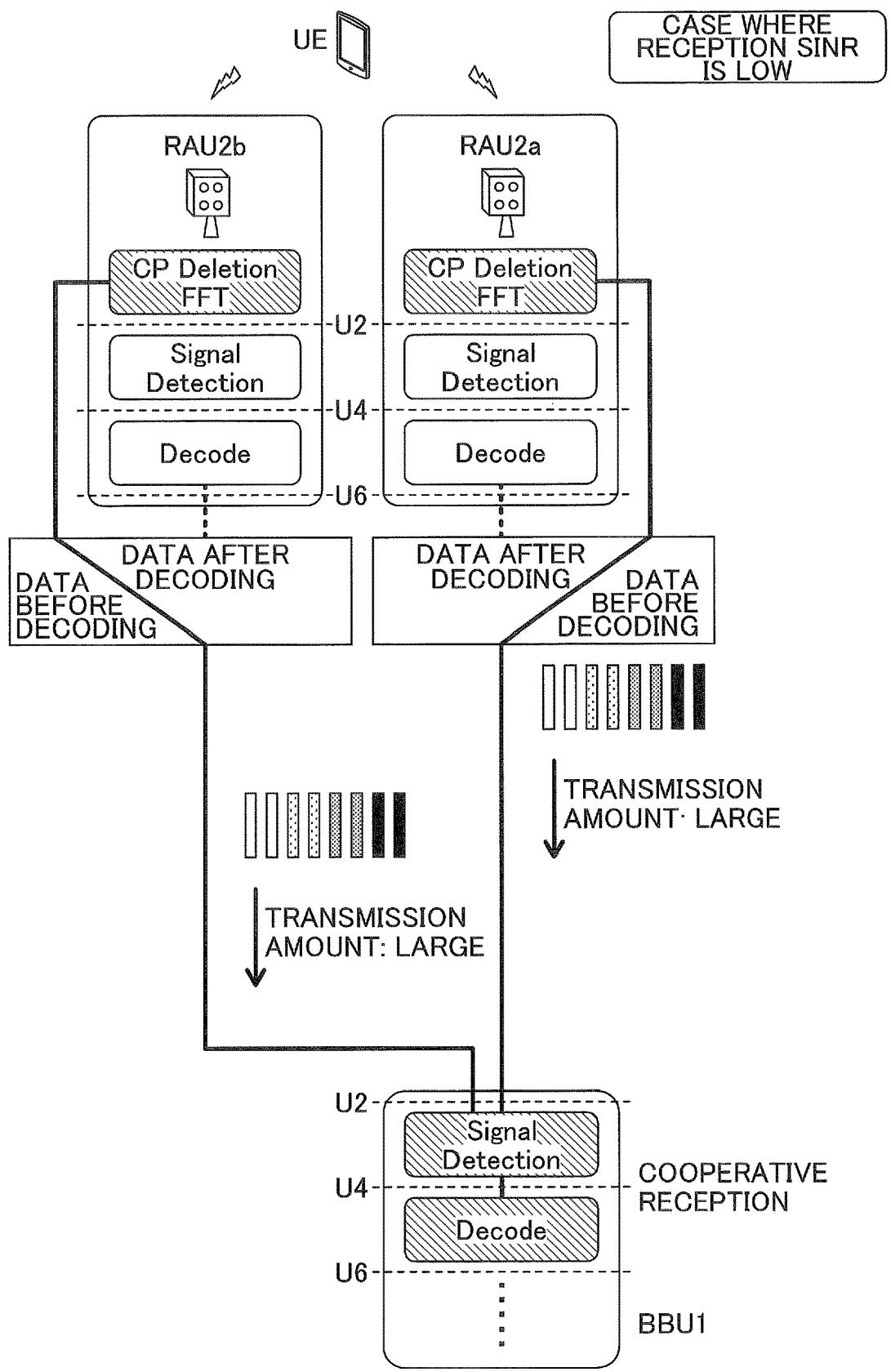
FIG. 7B is a view illustrating an operation example of a process for switching a functional share in the UL.

FIGS. 7A and 7B are views illustrating an operation example of function sharing changing processing in the UL. FIGS. 7A and 7B illustrate an operation example in the case of using the SINR as the predetermined reference value. Note that, in FIGS. 7A and 7B, a part of various kinds of signal processing of Layer 1 as illustrated in FIG. 4A is not illustrated, and boundaries "U2", "U4", and "U6" illustrated in FIGS. 7A and 7B respectively correspond to the boundaries "U2", "U4", and "U6" illustrated in FIG. 4(a). Note that the boundaries illustrated in FIGS. 7A and 7B are examples, and it is not intended to limit the boundaries. For example, the boundary "U2" in FIGS. 7A and 7B may be the boundary "U3", and the boundary "U4" in FIGS. 7A and 7B may be the boundary "U5". In addition, although not illustrated in FIGS. 7A and 7B, the function sharing may be changed at any one of boundaries "U1", and "U7" to "U9".

In addition, description is made on the assumption that the BBU 1 has a function of measuring the SINR of the UL signal that is received from the user equipment UE, and determination of the function sharing is made on the BBU 1 side on the basis of the SINR measured in the BBU 1.

As illustrated in FIG. 7A, in a case where the SINR of the UL signal received from the user equipment UE is equal to or greater than a predetermined threshold value, that is, reception quality of the UL signal is satisfactory, the BBU 1 determines that the entirety of a plurality of kinds of signal processing in accordance with Layer 1 are performed on the RAU 2a side and on RAU 2b side (determines that function sharing is made at the region "U6"). Subsequently, the BBU 1 notifies the RAU 2a and the RAU 2b of the determination result.

The RAU 2a and the RAU 2b perform the entirety of the plurality of kinds of signal processing in accordance with Layer 1 on the basis of the determination result that is transmitted in the notification, and transmit a UL signal that is decoded to the BBU 1 through the FH. The BBU 1 selects any one UL signal among UL signals which are received from the RAU 2a and the RAU 2b and are decoded, and performs signal processing subsequent to Layer 2 with respect to the UL signal that is selected.

On the other hand, as illustrated in FIG. 7B, in a case where the SINR of the UL signal received from the user equipment UE is less than a predetermined threshold value, that is, in a case where reception quality of the UL signal is not satisfactory, the BBU 1 determines that among the plurality of kinds of signal processing according to Layer 1, processing up to FFT processing is performed on the RAU 2a side and the RAU 2b side, and the subsequent signal processing is performed on the BBU 1 side (determines that function sharing is made at the region "U2"). Then, the BBU 1 notifies the RAU 2a and the RAU 2b of the determination result.

The RAU 2a and the RAU 2b perform signal processing up to the FFT processing among the plurality of kinds of signal processing according to Layer 1 on the basis of the determination result that is transmitted in the notification, and transmits the UL signal after the FFT processing to the BBU 1 through the FH. The BBU 1 performs cooperative reception (for example, minimum mean squared error (MMSE) composition, composition by maximum likelihood detection (MLD), and the like) with respect to the UL signals which are received from the RAU 2a and the RAU 2b and are subjected to the FFT processing, and performs signal processing subsequent to Layer 2.

Furthermore, in the above-described operation example, in a case where function sharing is changed for each user equipment UE, the BBU 1 may notify the RAU 2a and the RAU 2b of a determination result for each user equipment UE and information (for example, a radio resource position in a frequency direction, and the like) for identification of the user equipment UE in correlation with each other so that the RAU 2a and the RAU 2b can recognize that which radio resource is scheduled to which a user equipment UE on the RAU 2a side and the RAU 2b side.

According to this operation, in a case where reception quality of the UL signal received from the user equipment UE is satisfactory, the entirety of the plurality of kinds of signal processing of Layer 1 are performed on the RAU 2 side, and thus it is possible to secure reception performance of the UL signal while reducing the transmission amount through the FH. Furthermore, since the transmission amount through the FH is reduced, it is possible to suppress occurrence of transmission delay. On the other hand, in a case where reception quality of the UL signal received from the user equipment UE is not satisfactory, the cooperative reception is performed on the BBU 1 side, and thus it is possible to secure reception performance of the UL signal.

(Operation Example of a Process of Switching Function Sharing IN DL)

Figure 8A:
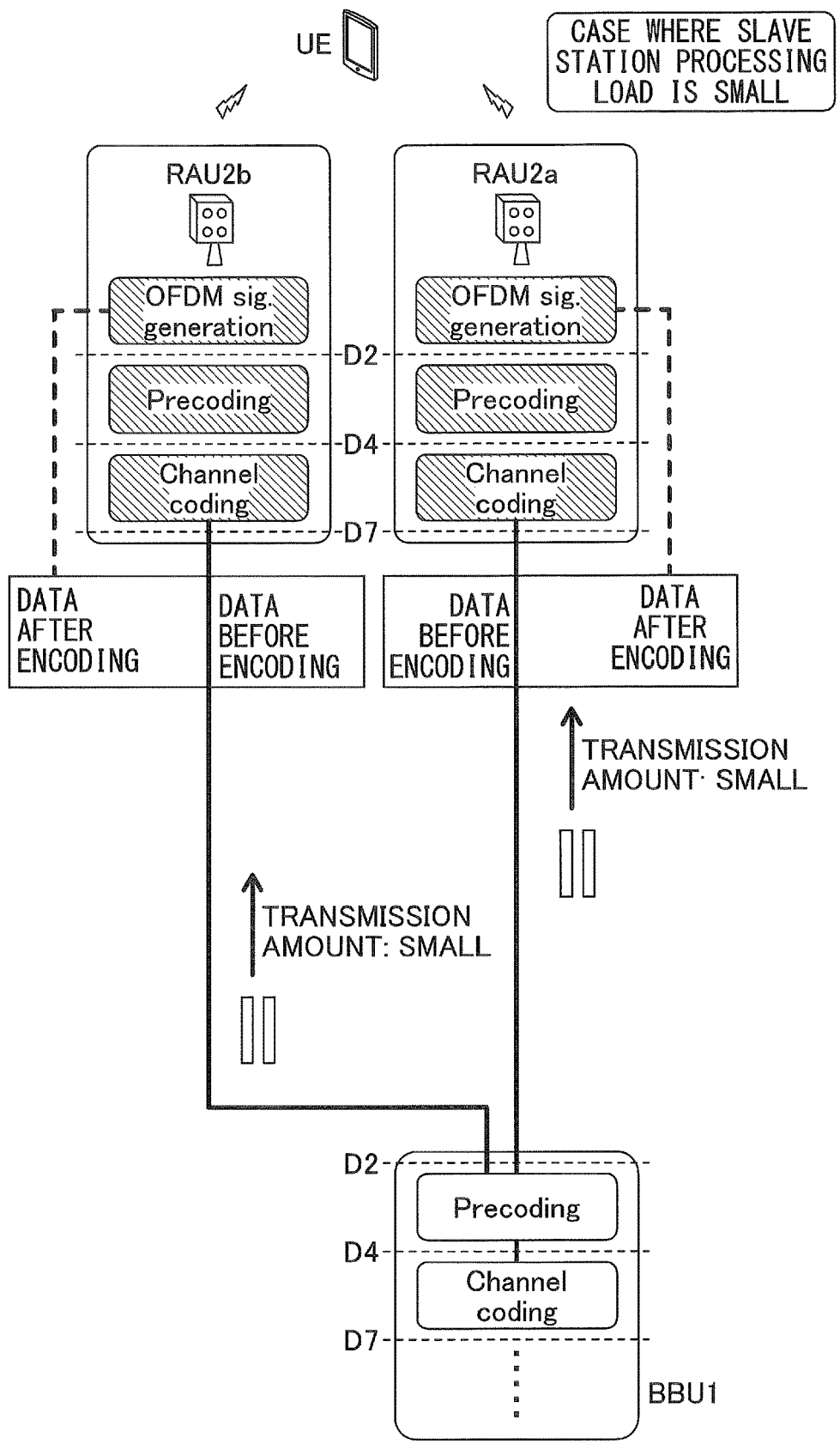
FIG. 8A is a view illustrating an operation example of the process for switching the functional share in the DL.
Figure 8B:
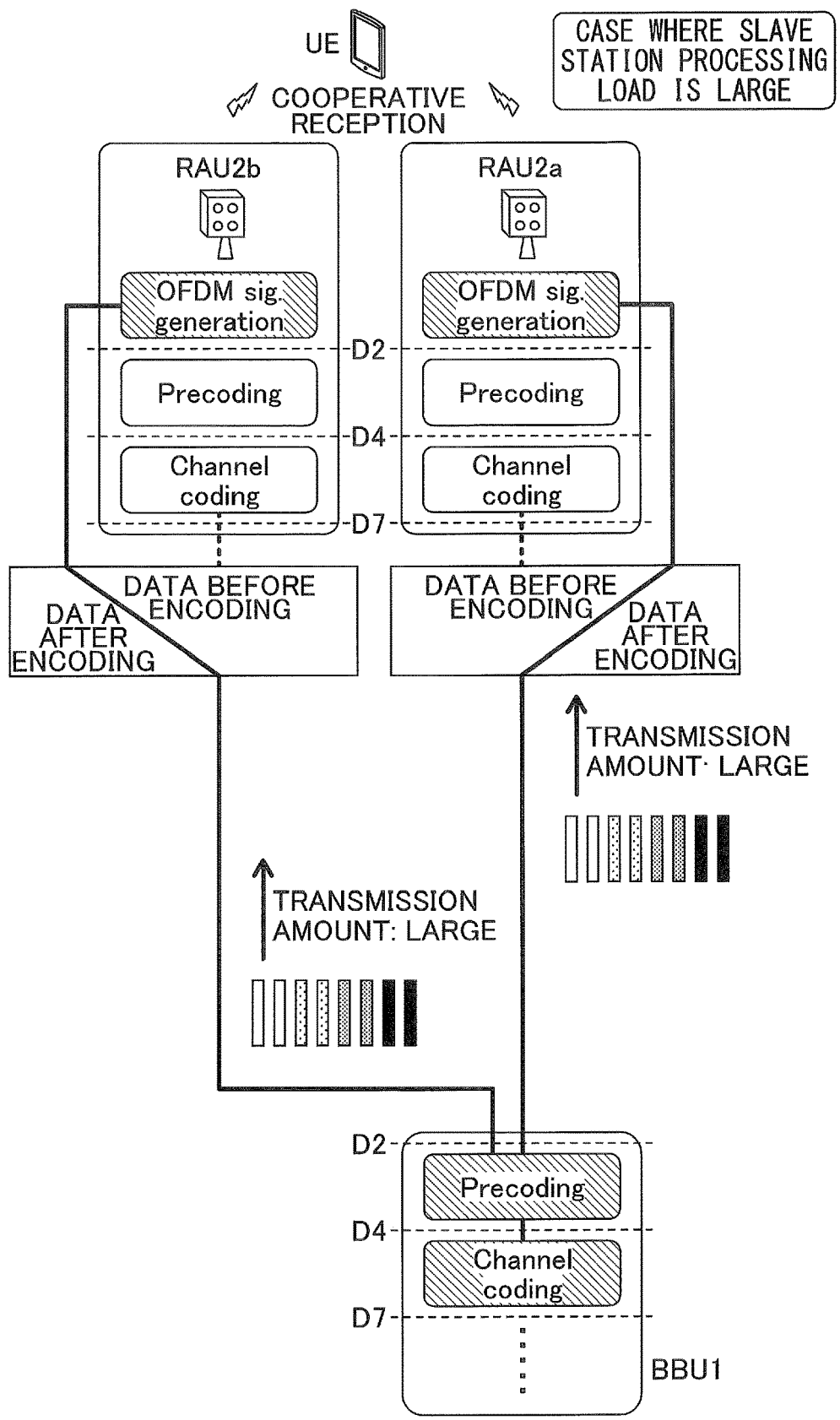
FIG. 8B is a view illustrating an operation example of the process for switching the functional share in the DL.

FIGS. 8A and 8B are views illustrating an operation example of a process of switching the function sharing in the DL. FIGS. 8A and 8B illustrate an operation example in the case of using a processing load of the RAU 2 as a predetermined reference value. Note that, in FIGS. 8A and 8B, a part of the plurality of kinds of signal processing of Layer 1, which are illustrated in FIG. 4B, is omitted. Boundaries "D2", "D4", and "D7" illustrated in FIGS. 8A and 8B respectively correspond to the boundaries "D2", "D4", and "D7" illustrated in FIG. 4B. The boundaries illustrated in FIGS. 8A and 8B are illustrative only, and there is no limitation to the boundaries. For example, the boundary "D2" in FIGS. 8A and 8B may be the boundary "D3", and the boundary "D4" in FIGS. 8A and 8B may be the boundary "D6" or "D7". In addition, although not illustrated in FIGS. 8A and 8B, the function sharing may be changed at any one of the boundaries "D1", and "D8" to "D10".

In the example of FIGS. 8A and 8B, description is made on the assumption that the RAU 2a (or the RAU 2b) measures a processing load thereof and notifies the BBU 1 of the processing load, and the function sharing is determined on the BBU 1 side.

As illustrated in FIG. 8A, in a case where the processing load of the RAU 2a (or the RAU 2b) is less than a predetermined threshold value, the BBU 1 determines that the entirety of the plurality of signal processing according to Layer 1 are performed on the RAU 2a side and the RAU 2b side (determines that function sharing is made at the region "D7". Furthermore, BBU 1 transmits a DL signal that is subjected to the signal processing according to Layer 2 to the RAU 2a and the RAU 2b through the FH on the basis of the determination result. In addition, when transmitting the DL signal to the RAU 2a and the RAU 2b, the BBU 1 may perform the transmission by applying a predetermined header to the DL signal, and by applying an identifier, which indicates that signal processing up to Layer 2 has been performed, to the header. In the case of FIG. 8A, in the RAU 2a and the RAU 2b, the entirety of the plurality of kinds of signal processing according to Layer 1 are performed.

Furthermore, in the case of FIG. 8A, the BBU 1 may be configured to transmit the DL signal, which is subjected to the signal processing according to Layer 2, to any one of the RAU 2a and the RAU 2b. According to this, it is possible to further reduce the amount of signals through the FH.

On the other hand, as illustrated in FIG. 8B, in a case where the processing load of the RAU 2 (or RAU 2b) is equal to or greater than a predetermined threshold value, the BBU 1 determines that among the plurality of kinds of signal processing according to Layer 1, processing up to resource element mapping is performed on the BBU 1 side (determines that function sharing is made at the region "D2"). In addition, the BBU 1 transmits the DL signal, which is subjected to the signal processing up to the resource element mapping, to the RAU 2a and the RAU 2b through the FH on the basis of the determination result. Furthermore, the BBU 1 may perform another precoding processing with respect to the DL signal to be transmitted to the RAU 2a and the DL signal to be transmitted to the RAU 2b on the basis of a propagation state (channel information and the like) of the DL signal between the RAU 2a and the RAU 2b, and the user equipment UE.

When transmitting the DL signal to the RAU 2a and the RAU 2b, the BBU 1 may perform the transmission by applying a predetermined header to the DL signal, and by applying an identifier, which indicates that signal processing up to the resource element mapping has been performed, to the header. In the case of FIG. 8B, in the RAU 2*a* and the RAU 2*b*, signal processing in accordance with OFDM signal generation is performed.

According to this operation, when the processing load of the RAU 2 is tight, more kinds of signal processing are set to be performed on the BBU 1 side, and thus it is possible to reduce the processing load of the RAU 2. In addition, in a case where the processing load of the RAU 2 is low, more kinds of signal processing are set to be performed on the RAU 2 side, and thus it is possible to reduce the transmission amount through the FH. In addition, since the transmission amount through the FH is reduced, it is possible to suppress occurrence of transmission delay.

(Supplementary Item with Respect to Procedure)

When function sharing is changed, the BBU 1 or the RAU 2 may stop scheduling of the DL and the UL for a predetermined period of time. According to this, it is possible to avoid a possibility that the function sharing is changed during transmission of the DL signal or the UL signal, and thus a signal is damaged.

<Functional Configuration>

Functional configuration examples of the BBU 1 and the RAU 2 are described, which are for implementing the operation of the above-described embodiment.

(BBU)

Figure 9:
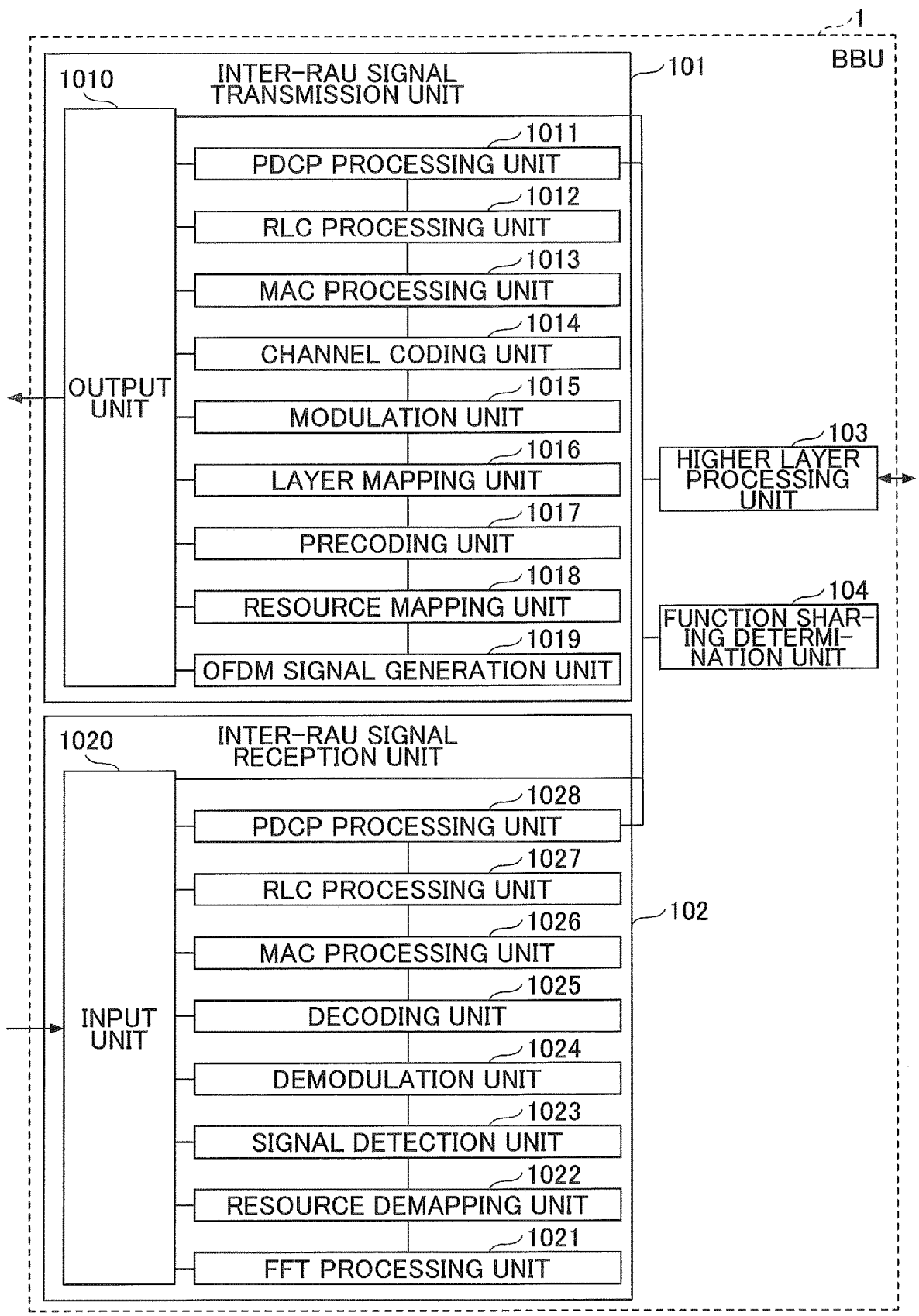
FIG. 9 is a view illustrating a functional configuration example of the BBU according to the embodiment.

FIG. 9 is a view illustrating a functional configuration example of the BBU according to this embodiment. As illustrated in FIG. 9, the BBU 1 includes an inter-RAU signal transmission unit 101, an inter-RAU signal reception unit 102, a higher layer processing unit 103, and a function sharing determination unit 104. Furthermore, FIG. 9 illustrates only function units, which particularly related to this embodiment, of the BBU 1, and the BBU 1 also has a function (not illustrated) of performing at least an operation in conformity to LTE (including 5G). In addition, the functional configuration illustrated in FIG. 9 is illustrative only. Function classification or the name of the function units may be arbitrary as long as the operation according to this embodiment can be executed.

The inter-RAU signal transmission unit 101 has a function of performing signal processing with respect to a DL signal received from the higher layer processing unit 103 on the basis of function sharing as a notification from the function sharing determination unit 104 or the RAU 2 to generate a signal, and of transmitting the signal that is generated to the RAU 2 through the FH. The inter-RAU signal reception unit 102 has a function of performing signal processing with respect to an UL signal received from the RAU 2 through the FH on the basis of the function sharing as a notification from the function sharing determination unit 104 or the RAU 2, and of transmitting the resultant signal to the higher layer processing unit 103.

In addition, the inter-RAU signal transmission unit 101 transmits the signal, which is subjected to the signal processing, to any one of a plurality of the RAUs 2 or the plurality of RAUs 2 (performs cooperative transmission). In addition, the inter-RAU signal reception unit 102 performs signal processing by using one signal or a plurality of signals among a plurality of signals which are subjected to the signal processing in the plurality of RAUs 2 (performs cooperative reception). In addition, the inter-RAU signal transmission unit 101 and the inter-RAU signal reception unit 102 include a function as an interface of a predetermined protocol that is used in the FH.

The higher layer processing unit 103 includes a function of performing signal processing on and above Layer 2, and a function of transmitting, to a core network, etc., a signal to which the signal processing up to Layer 2 or the signal processing above Layer 2 is applied.

The function sharing determination unit 104 includes a function of determining allocation of signal processing that is performed by the RAU 2 and signal processing that is performed by the BBU 1 on the basis of a predetermined reference value.

In addition, the inter-RAU signal transmission unit 101 is classified into a PDCP processing unit 1011 as a processing unit that performs signal processing of the DL of Layer 2, an RLC processing unit 1012, a MAC processing unit 1013, a channel coding unit 1014 as a processing unit that performs signal processing of the DL of Layer 1, a modulation unit 1015, a layer mapping unit 1016, a precoding unit 1017, a resource mapping unit 1018, and an OFDM signal generation unit 1019. In addition, the inter-RAU signal transmission unit 101 includes an output unit 1010. The PDCP processing unit 1011 performs various kinds of processing in accordance with a PDCP sub-layer. The RLC processing unit 1012 performs various kinds of processing in accordance with the RLC sub-layer. The MAC processing unit 1013 performs various kinds of processing in accordance with a MAC sub-layer. The channel coding unit 1014 performs processing such as application of CRC, code block division, and rate matching with respect to the DL signal received from the higher layer processing unit 103. The modulation unit 1015 modulates a bit stream by using a predetermined modulation method. The layer mapping unit 1016 maps a modulation symbol to respective layers. The precoding unit 1017 performs precoding processing with respect to the modulation symbol of the respective layers to map the modulation symbol of the respective layers to respective antenna ports. The resource mapping unit 1018 maps the modulation symbol, which is transmitted from the respective antenna ports, to a predetermined resource element. The OFDM signal generation unit 1019 performs IFFT processing with respect to a signal of a frequency region that is mapped to a resource element to generate an OFDM signal. The output unit 1010 extracts a signal, which is generated by any one of the higher layer processing unit 103, the PDCP processing unit 1011, the RLC processing unit 1012, the MAC processing unit 1013, the channel coding unit 1014, the modulation unit 1015, the layer mapping unit 1016, the precoding unit 1017, the resource mapping unit 1018, and the OFDM signal generation unit 1019, on the basis of the function sharing as a notification from the function sharing determination unit 104 or the RAU 2, and transmits the signal to the RAU 2.

In addition, the inter-RAU signal reception unit 102 is classified into an FFT processing unit 1021 as a processing unit that performs signal processing of the UL of Layer 1, a resource demapping unit 1022, a signal detection unit 1023, a demodulation unit 1024, a decoding unit 1025, a MAC processing unit 1026 as a processing unit that performs signal processing of the UL of Layer 2, an RLC processing unit 1027, and a PDCP processing unit 1028. In addition, the inter-RAU signal reception unit 102 includes an input unit 1020. The FFT processing unit 1021 performs removal of CP and FFT processing with respect to an UL signal that is received. The resource demapping unit 1022 extracts a modulation symbol, which is scheduled to respective pieces of a user equipment UE, from a modulation symbol that is subjected to the FFT processing. The signal detection unit 1023 separates a spatial multiplex modulation symbol for each layer. Furthermore, for example, the signal detection unit 1023 may perform signal detection by using MLD, and the like. The demodulation unit 1024 demodulates a bit stream from the modulation symbol that is detected. The decoding unit 1025 performs processing of decoding the bit stream that is demodulated. The MAC processing unit 1026 performs various kinds of processing in accordance with a MAC sub-layer. The RLC processing unit 1027 performs various kinds of processing in accordance with an RLC sub-layer. The PDCP processing unit 1028 performs various kinds of processing in accordance with a PDCP sub-layer. The input unit 1020 transmits the UL signal, which is received from the RAU 2, to any one of the FFT processing unit 1021, the resource demapping unit 1022, the signal detection unit 1023, the demodulation unit 1024, the decoding unit 1025, the MAC processing unit 1026, the RLC processing unit 1027, the PDCP processing unit 1028, and the higher layer processing unit 103 on the basis of the function sharing as a notification from the function sharing determination unit 104 or the RAU 2.

(RAU)

Figure 10:
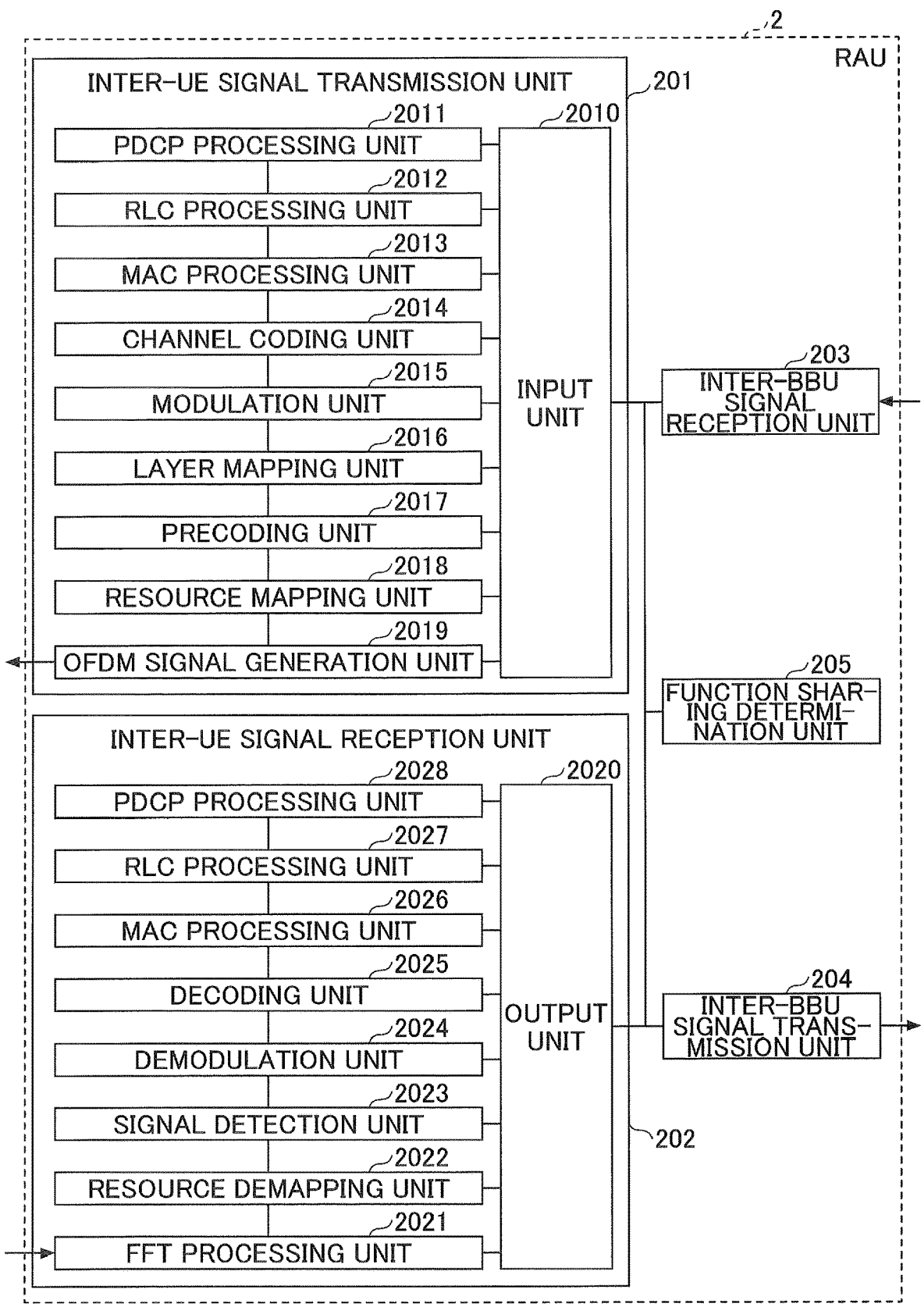
FIG. 10 is a view illustrating a functional configuration example of the RAU according to the embodiment.

FIG. 10 is a view illustrating a functional configuration example of the RAU in accordance with this embodiment. As illustrated in FIG. 10, the RAU 2 includes an inter-UE signal transmission unit 201, an inter-UE signal reception unit 202, an inter-BBU signal reception unit 203, an inter-BBU signal transmission unit 204, and a function sharing determination unit 205. Furthermore, FIG. 10 illustrates only function units, which particularly related to this embodiment, of the RAU 2, and the RAU 2 also has a function (not illustrated) of performing at least an operation in conformity to LTE (including 5G). In addition, the functional configuration illustrated in FIG. 10 is illustrative only. Function classification or the name of the function units may be arbitrary as long as the operation according to this embodiment can be executed.

The inter-UE signal transmission unit 201 includes a function of performing signal processing with respect to a DL signal received from the inter-BBU signal reception unit 203 on the basis of function sharing as a notification from the function sharing determination unit 205 or the BBU 1 to generate a signal, and of transmitting the signal that is generated to the user equipment UE. The inter-UE signal reception unit 202 includes a function of performing signal processing with respect to an UL signal received from the user equipment UE on the basis of the function sharing as a notification from the function sharing determination unit 205 or the BBU 1, and of transmitting the signal to the inter-BBU signal transmission unit 204.

The inter-BBU signal reception unit 203 and the inter-BBU signal transmission unit 204 include a function of transmitting and receiving a signal to and from the BBU 1, and a function as an interface of a predetermined protocol that is used in the FH.

The function sharing determination unit 205 includes a function of determining allocation of signal processing that is performed by the RAU 2 and signal processing that is performed by the BBU 1 on the basis of a predetermined reference value.

In addition, the inter-UE signal transmission unit 201 is classified into a PDCP processing unit 2011 as a processing unit that performs signal processing of the DL of Layer 2, an RLC processing unit 2012, a MAC processing unit 2013, a channel coding unit 2014 as a processing unit that performs signal processing of the DL of Layer 1, a modulation unit 2015, a layer mapping unit 2016, a precoding unit 2017, a resource mapping unit 2018, and OFDM signal generation unit 2019. In addition, the inter-UE signal transmission unit 201 includes an input unit 2010. The PDCP processing unit 2011, the RLC processing unit 2012, the MAC processing unit 2013, the channel coding unit 2014, the modulation unit 2015, the layer mapping unit 2016, the precoding unit 2017, the resource mapping unit 2018, and the OFDM signal generation unit 2019 are respectively the same as the PDCP processing unit 1011, the RLC processing unit 1012, the MAC processing unit 1013, the channel coding unit 1014, the modulation unit 1015, the layer mapping unit 1016, the precoding unit 1017, the resource mapping unit 1018, and the OFDM signal generation unit 1019 of the BBU 1, and thus description thereof will be omitted. The input unit 2010 transmits a DL signal received from the inter-BBU signal reception unit 203 to any one of the PDCP processing unit 2011, the RLC processing unit 2012, the MAC processing unit 2013, the channel coding unit 2014, the modulation unit 2015, the layer mapping unit 2016, the precoding unit 2017, the resource mapping unit 2018, and the OFDM signal generation unit 2019 on the basis of function sharing as a notification from the function sharing determination unit 205 or the BBU 1.

In addition, the inter-UE signal reception unit 202 is classified into an FFT processing unit 2021 as a processing unit that performs signal processing of the UL of Layer 1, a resource demapping unit 2022, a signal detection unit 2023, a demodulation unit 2024, a decoding unit 2025, a MAC processing unit 2026 as a processing unit that performs signal processing of the UL of Layer 2, an RLC processing unit 2027, and a PDCP processing unit 2028. In addition, the inter-UE signal reception unit 202 includes an output unit 2020. The FFT processing unit 2021, the resource demapping unit 2022, the signal detection unit 2023, the demodulation unit 2024, the decoding unit 2025, the MAC processing unit 2026, the RLC processing unit 2027, and the PDCP processing unit 2028 are respectively the same as the FFT processing unit 1021, the resource demapping unit 1022, the signal detection unit 1023, the demodulation unit 1024, and the decoding unit 1025, the MAC processing unit 1026, the RLC processing unit 1027, and the PDCP processing unit 1028 of the BBU 1, and, thus, the description is omitted. The output unit 2020 extracts a signal, which is generated by any one of the FFT processing unit 2021, the resource demapping unit 2022, the signal detection unit 2023, the demodulation unit 2024, the decoding unit 2025, the MAC processing unit 2026, the RLC processing unit 2027, and the PDCP processing unit 2028, on the basis of the function sharing as a notification from the function sharing determination unit 205 or the BBU 1, and transmits the signal to the inter-BBU signal transmission unit 204.

The entirety of the above-described functional configuration of the BBU 1 and the RAU 2 may be implemented by a hardware circuit (for example, one or a plurality of IC chips). In addition, a part of the functional configuration may be configured as a hardware circuit, and the other portions may be implemented by a CPU and a program.

<Hardware Configuration>

(BBU)

Figure 11:
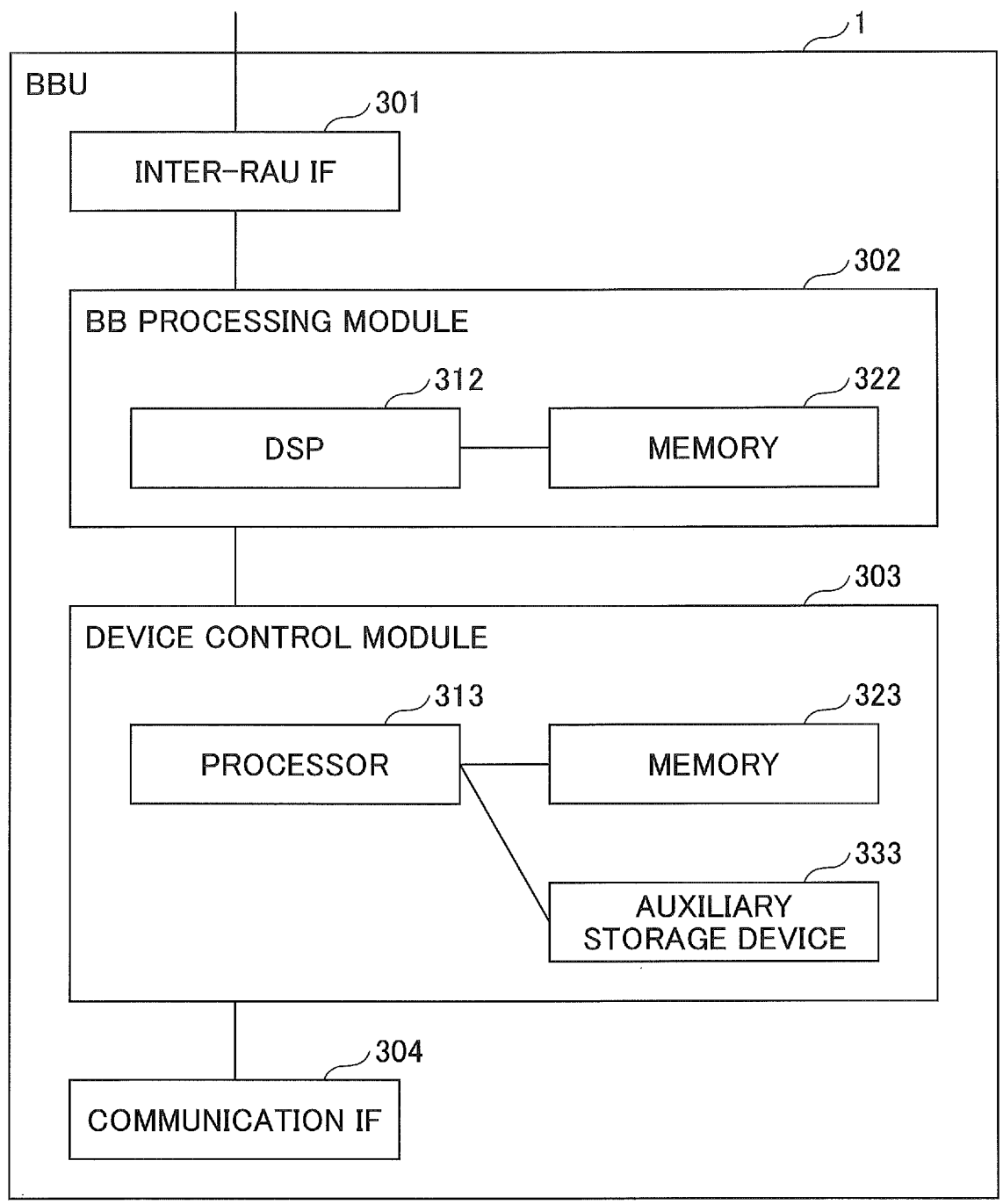
FIG. 11 is a view illustrating a hardware configuration example of the BBU according to the embodiment.

FIG. 11 is a view illustrating a hardware configuration example of the BBU according to this embodiment. FIG. 11 illustrates a configuration that is closer to a mounting example in comparison to FIG. 9. As illustrated in FIG. 11, the BBU 1 includes an inter-RAU IF 301 as an interface for connection to the RAU 2, a BB processing module 302 that performs dedicated line connection system signal processing, a device control module 303 that performs processing of a higher layer and the like, and a communication IF 304 as an interface for connection to a core network and the like.

The inter-RAU IF 301 has a function of connecting physical lines of the FH that connects the BBU 1 and the RAU 2 to each other, and a function of terminating a protocol that is used in the FH. For example, the inter-RAU IF 301 includes parts of the inter-RAU signal transmission unit 101 and the inter-RAU signal reception unit 102 which are illustrated in FIG. 9.

The BB processing module 302 performs processing of converting an IP packet and a signal that is transmitted and received to and from the RAU 2. A DSP 312 is a processor that performs signal processing in the BB processing module 302. A memory 322 is used as a work area of the DSP 312. For example, the BB processing module 302 includes parts of the inter-RAU signal transmission unit 101 and the inter-RAU signal reception unit 102 which are illustrated in FIG. 9, a part of the higher layer processing unit 103, and a part of the function sharing determination unit 104.

The device control module 303 performs protocol processing of an IP layer, operation and maintenance processing (OAM), and the like. A processor 313 is a processor that performs processing that is performed by the device control module 303. The memory 323 is used as a work area of the processor 313. Examples of an auxiliary storage device 333 include an HDD, and the like, and the auxiliary storage device 333 stores various kinds of setting information for an operation of the base station eNB, and the like. For example, the device control module 303 includes parts of the higher layer processing unit 103 and the function sharing determination unit 104 which are illustrated in FIG. 9.

(RAU)

Figure 12:
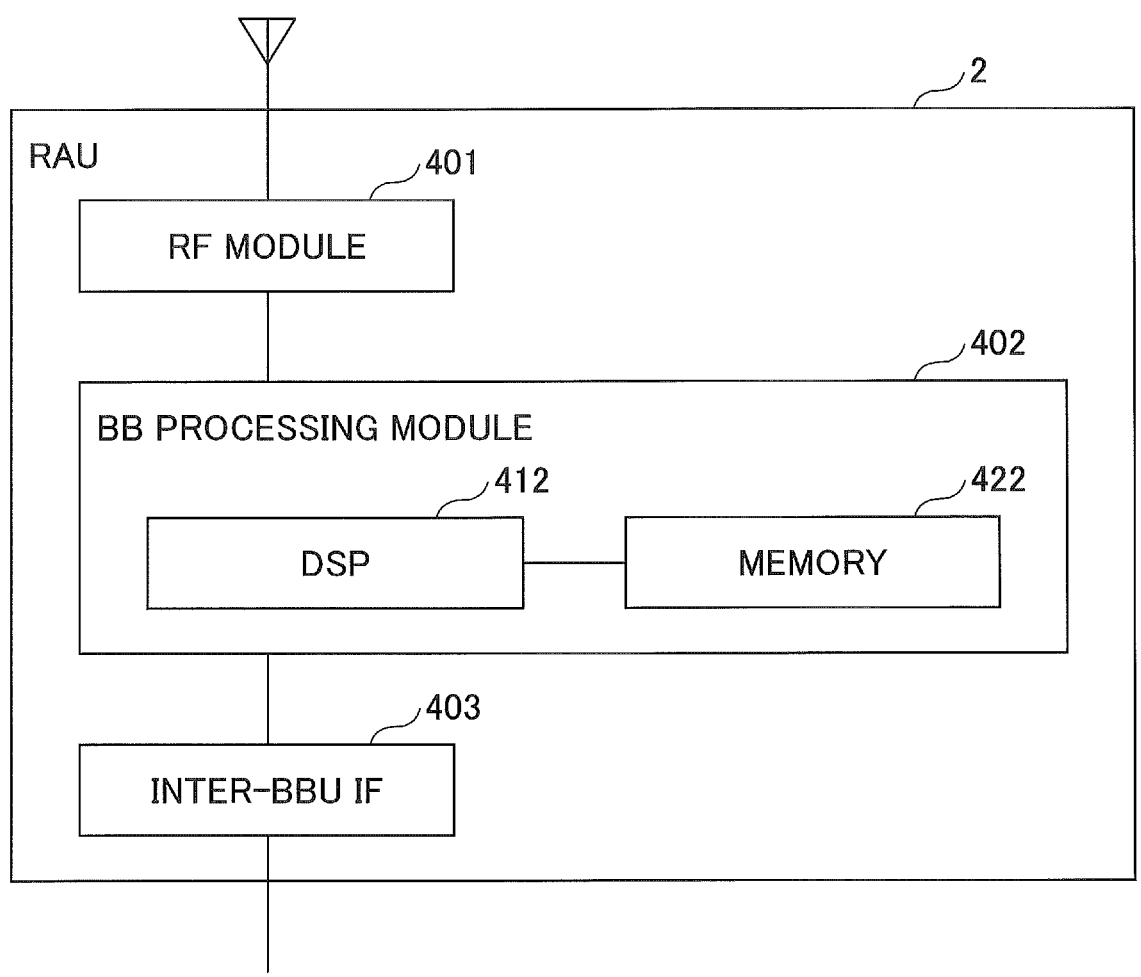
FIG. 12 is a view illustrating a hardware configuration example of the RAU according to the embodiment.

FIG. 12 is a view illustrating a hardware configuration example of the RAU according to this embodiment. FIG. 12 illustrates a configuration that is closer to a mounting example in comparison to FIG. 10. As illustrated in FIG. 12, the RAU 2 includes a radio frequency (RF) module 401 that performs processing related to a radio signal, a base band (BB) processing module 402 that performs dedicated line connection system signal processing, and an inter-BBU IF 403 as an interface for connection to the BBU 1.

The RF module 401 performs digital-to-analog (D/A) conversion, orthogonal modulation, frequency conversion, power amplification, and the like with respect to a digital baseband signal received from the BB processing module 402 to generate a radio signal to be transmitted from an antenna. In addition, the RF module 401 performs frequency conversion, analog-to-digital (A/D) conversion, orthogonal demodulation, and the like with respect to a radio signal that is received to generate a digital baseband signal, and transmits the signal to the BB processing module 402. The RF module 401 includes an RF function. For example, the RF module 401 includes parts of the inter-UE signal transmission unit 201 and the inter-UE signal reception unit 202 which are illustrated in FIG. 10.

The BB processing module 402 performs processing of converting a signal that is transmitted and received to and from the BBU 1 through the inter-BBU IF 403, and the digital baseband signal from each other. A digital signal processor (DSP) 412 is a processor that performs signal processing in the BB processing module 402. The memory 422 is used as a work area of the DSP 412. For example, the BB processing module 402 includes parts of the inter-UE signal transmission unit 201 and the inter-UE signal reception unit 202, and the function sharing determination unit 205 which are illustrated in FIG. 10.

The inter-BBU IF 403 has a function of connecting physical lines of the FH that connects the BBU 1 and the RAU 2 to each other, and a function of terminating a protocol that is used in the FH. For example, the inter-BBU IF 403 includes the inter-BBU signal reception unit 203 and the inter-BBU signal transmission unit 204 which are illustrated in FIG. 10.

<Conclusion>

As described above, according to an embodiment, there is provided a radio communication system including a first base station, a second base station, a third base station that performs a communication with the first base station and the second base station, and a user equipment that performs a communication with the first base station and the second base station, the radio communication system including a determination unit that determines allocation of signal processing that is commonly performed by the first base station and the second base station and signal processing that is performed by the third base station, based on a predetermined reference value; a first signal processor that performs the signal processing allocated to the first base station in accordance with the allocation that is determined by the determination unit; a second signal processor that performs the signal processing allocated to the second base station in accordance with the allocation that is determined by the determination unit; and a third signal processor that performs the signal processing allocated to the third base station in accordance with the allocation that is determined by the determination unit. According to the radio communication system, there is provided a technology capable of appropriately changing function sharing between the BBU 1 and the RAU 2 in a radio communication network by a C-RAN.

The predetermined reference value may be a CRC check success rate, an SINR, or an SNR of an uplink signal that is transmitted from the user equipment or a downlink signal that is received by the user equipment, the number of retransmission times of the uplink signal or the downlink signal, or a channel estimation error, and wherein the determination unit may determine the allocation of the signal processing that is commonly performed by the first base station and the second base station and the signal processing that is performed by the third base station based on the CRC check success rate, the SINR, or the SNR of the uplink signal that is transmitted from the user equipment or the downlink signal that is received by the user equipment, the number of retransmission times of the uplink signal or the downlink signal, or the channel estimation error. According to this, it is possible to appropriately change function sharing between the BBU 1 and the RAU 2 by using the CRC check success rate, the SINR, or the SNR of the uplink signal or the downlink signal, the number of retransmission times of the uplink signal or the downlink signal, or the channel estimation error.

The predetermined reference value may be a processing load on the first base station, a processing load on the second base station, or a processing load on the third base station, and wherein the determination unit may determine the allocation of the signal processing that is commonly performed by the first base station and the second base station and the signal processing that is performed by the third base station on based on the processing load on the first base station, the processing load on the second base station, or the processing load on the third base station. According to this, it is possible to appropriately change the function sharing between the BBU 1 and the RAU 2 on the basis of the processing load of the RAU 2. In addition, it is possible to reduce the processing load of the RAU 2.

The predetermined reference value may be information indicating whether at least one of the number of antennas of the first base station and the number of antennas of the second base station is greater than or equal to the number of antennas of the user equipment, and wherein the determination unit may determine the allocation of the signal processing that is commonly performed by the first base station and the second base station and the signal processing that is performed by the third base station based on whether at least one of the number of antennas of the first base station and the number of antennas of the second base station is greater than or equal to the number of antennas of the user equipment. According to this, it is possible to appropriately change the function sharing between the BBU 1 and the RAU 2 on the basis of the number of antennas provided to the user equipment UE and the number of antennas provided to the RAU 2.

The determination unit may determine that entire layer 1 signal processing of the uplink signal is performed by the first signal processor of the first base station and the second signal processor of the second base, upon determining that the CRC check success rate, the SINR, or the SNR of the uplink signal that is transmitted from the user equipment or the downlink signal that is received by the user equipment is greater than or equal to a predetermined threshold value, upon determining that the number of retransmission times of the uplink signal that is transmitted from the user equipment or the downlink signal that is received by the user equipment is less than a predetermined threshold value, or upon determining that the channel estimation error of the uplink signal that is transmitted from the user equipment or the downlink signal that is received by the user equipment is less than a predetermined threshold value, and wherein the third signal processor may perform layer 2 signal processing using one of a signal that is processed by the first signal processor and a signal that is processed by the second signal processor. According to this, it is possible to determine whether or not to perform cooperative reception in the BBU 1 while reducing a transmission amount through the FH.

The determination unit may determine that a part of the layer 1 signal processing of the uplink signal is performed by the first signal processor of the first base station and the second signal processor of the second base station and a remaining part of the layer 1 signal processing is performed by the third signal processor of the third base station upon determining that the CRC check success rate, the SINR, or the SNR of the uplink signal that is transmitted from the user equipment or the downlink signal that is received by the user equipment is less than a predetermined threshold value, upon determining that the number of retransmission times of the uplink signal that is transmitted from the user equipment or the downlink signal that is received by the user equipment is greater than or equal to a predetermined threshold value, or upon determining that the channel estimation error of the uplink signal that is transmitted from the user equipment or the downlink signal that is received by the user equipment is greater than or equal to a predetermined threshold value, and wherein the third signal processor may perform a remaining part of the layer 1 signal processing and layer 2 signal processing by using both of a signal that is processed by the first signal processor and a signal that is processed by the second signal processor. According to this, it is possible to determine whether or not to perform cooperative reception in the BBU 1 while reducing a transmission amount through the FH.

According to an embodiment, there is provided a base station that is used as a third base station in a radio communication system including a first base station, a second base station, the third base station that performs a communication with the first base station and the second base station, and a user equipment that performs a communication with the first base station and the second base station, the base station including a determination unit that determines allocation of signal processing that is commonly performed by the first base station and the second base station and signal processing that is performed by the base station on the basis of a predetermined reference value; and a signal processor that performs the signal processing allocated to the base station in accordance with the allocation that is determined in the determination unit. According to this base station, there is provided a technology capable of appropriately changing the function sharing between the BBU 1 and the RAU 2 in the radio communication network by the C-RAN.

According to an embodiment, there is provided a base station that is used as a first base station in a radio communication system including the first base station, a second base station, a third base station that performs a communication with the first base station and the second base station, and a user equipment that performs a communication with the first base station and the second base station, the base station including a determination unit that determines allocation of signal processing that is commonly performed by the base station and the second base station and signal processing that is performed by the third base station based on a predetermined reference value; and a signal processor that performs the signal processing allocated to the base station in accordance with the allocation that is determined in the determination unit. According to this base station, there is provided a technology capable of appropriately changing the function sharing between the BBU 1 and the RAU 2 in the radio communication network by the C-RAN.

<Supplement of Embodiment>

Hereinbefore, the configuration of the respective devices (the BBU 1 and the RAU 2) described in the embodiment of the invention may be a configuration that is implemented when a program is executed by a processor (CPU) in the device including the CPU and a memory, or a configuration that is implemented by hardware such as a hardware circuit including a logic of the processing described in this embodiment. In addition, the program or the hardware may coexist.

Hereinbefore, description has been given of the embodiment of the invention. However, the invention is not limited to the embodiment, and it should be understood by those skilled in the art that various modification examples, variation examples, alternative examples, substitution examples, and the like can be made. Description has been made by using a specific numerical example for comprehension of the invention, but numerical values are illustrative only, and arbitrary appropriate values may be used unless otherwise stated. The classification of the items in the above description is not essential in the invention, and details described in two or more items may be used in combination as necessary. In addition, details described in any item may be applied to details described in a different item (as long as inconsistency does not occur). It cannot be said that the boundary of the function units in the functional block diagram or the processing units correspond to a boundary of physical components. Operations of a plurality of function units may be performed physically with one component, or an operation of one function unit may be performed physically with a plurality of components. In the sequences and the flowcharts described in the embodiment, the order thereof may be changed as long as inconsistency does not occur. The BBU1 and the RAU 2 have been described by using functional block diagrams for convenience of processing description, but the devices may be implemented by hardware, software, or a combination thereof. Software that operations by the processor provided to the BBU 1 in accordance with the embodiment of the invention, and software that operates by the processor provided to the RAU 2 in accordance with the embodiment of the invention may be respectively stored in a random access memory (RAM), a flash memory, a read only memory (ROM), an EPROM, an EEPROM, a register, a hard disk drive (HDD), a removable disk, a CD-ROM, a database, a server, or other appropriate storage media.

The first base station and the second base station in this embodiment are examples of the RAU 2. The third base station is an example of the BBU 1. The function sharing determination unit 104 or the function sharing determination unit 205 is an example of the determination unit. The inter-UE signal transmission unit 201 or the inter-UE signal reception unit 202 is an example of the first signal processing unit and the second signal processing unit. The inter-RAU signal transmission unit 101 or the inter-RAU signal reception unit 102 is an example of the third signal processing unit.

Reporting of information is not limited to the aspects/embodiments described in this specification, and may be performed by another method. For example, reporting of information may be implemented by physical layer signaling (e.g., DCI (Downlink Control Information)), UCI (Uplink Control Information)), higher layer signaling (e.g., RRC signaling, MAC signaling, broadcast information (MIB (Master Information Block), SIB (System Information Block)), other signals or a combination thereof. Furthermore, the RRC message may be referred to as RRC signaling. Furthermore, the RRC message may be, for example, an RRC connection setup (RRC Connection Setup) message, an RRC connection reconfiguration (RRC Connection Reconfiguration) message, and so forth.

The aspects/embodiments described in the specification can be applied to LTE (Long Term Evolution); LTE-A (LTE-Advanced); SUPER 3G; IMT-Advanced; 4G; 5G; FRA (Future Radio Access); W-CDMA (registered trademark); GSM (registered trademark); CDMA 2000; UMB (Ultra Mobile Broadband); IEEE 802.11 (Wi-Fi); IEEE 802.16 (WiMAX); IEEE 802.20; UWB (Ultra-Wide Band); Bluetooth (registered trademark); a system that utilizes another suitable system and/or a next generation system evolved based on these.

The decision or determination may be performed by a value (0 or 1) represented by one bit; may be performed by a Boolean value (Boolean: true or false); or by numerical value comparison (e.g., a comparison with a predetermined value).

Note that the terms described in this specification and/or terms required for understanding the specification may be replaced with terms having the same or similar meanings. For example, a channel and/or a symbol may be a signal (signal). Furthermore, a signal may be a message.

The UE may be referred to, by a person skilled in the art, as a subscriber station; a mobile unit; a subscriber unit; a wireless unit; a remote unit; a mobile device; a wireless device; a wireless communication device; a remote device; a mobile subscriber station; an access terminal; a mobile terminal; a wireless terminal; a remote terminal; a handset; a user agent; a mobile client; a client; or some other suitable terms.

The each aspect/embodiment described in the specification may be used alone; may be used in combination; or may be used by switching depending on execution. Furthermore, reporting of predetermined information (e.g., reporting of "being X") is not limited to the method of explicitly performing, and may be performed implicitly (e.g., not perform reporting of the predetermined information).

The terms "determine (determining)" and "decide (determining)" may encompass a wide variety of operations. The "determine" and "decide" may include, for example, "determine" and "decide" what is calculated (calculating), computed (computing), processed (processing), derived (deriving), investigated (investigating), looked up (looking up) (e.g., looked up in tables, databases, or other data structures), ascertained (ascertaining). Furthermore, the "determine" and "decide" may include deeming that "determination" and "decision" are made on reception (receiving) (e.g., receiving information), transmission (transmitting) (e.g., transmitting information), input (input), output (output), and access (accessing) (e.g., accessing data in a memory). Furthermore, the "determine" and "decide" may include deeming that "determination" and "decision" are made on what is resolved (resolving), selected (selecting), chosen (choosing), established (establishing), and compared (comparing). Namely, the "determine" and "decide" may include deeming that some operation is "determined" or "decided."

The phrase "based on" used in this specification does not imply "based only on" unless explicitly stated otherwise. In other words, the phrase "based on" implies both "based only on" and "based at least on."

Furthermore, the order of the processing procedures, sequences, and so forth of the aspects/embodiments described in the specification may be re-arranged, provided that they do not contradict. For example, for the methods described in the specification, the elements of various steps are presented in an exemplary order, and are not limited to the specific order presented.

The input/output information, etc., may be stored in a specific location (e.g., a memory), or managed in a management table. The input/output information, etc., may be overwritten, updated, or additionally written. The output information, etc., may be deleted. The input information, etc., may be transmitted to another device.

Reporting of predetermined information (e.g., reporting of "being X") is not limited to the method of explicitly performing, and may be implicitly performed (e.g., reporting of the predetermined information is not performed).

The information signals, etc. described in the specification may be represented by using any of a variety of different techniques. For example, the data, indication, command, information, signal, bit, symbol, chip, etc. may be represented by a voltage, an electric current, an electromagnetic wave, a magnetic field or magnetic particles, a light field or photons, or any combination thereof.

The present application is based upon and claims the benefit of priority of Japanese Patent Application No. 2016-048748 filed on Mar. 11, 2016 and the entire contents of Japanese Patent Application No. 2016-048748 are incorporated herein by reference.

LIST OF REFERENCE SYMBOLS

1 BBU
2 RAU
eNB Base station
101 Inter-RAU signal transmission unit
102 Inter-RAU signal reception unit
103 Higher layer processing unit
104 Function sharing determination unit
201 Inter-UE signal transmission unit
202 Inter-UE signal reception unit
203 Inter-BBU signal reception unit 204 Inter-BBU signal transmission unit
205 Function sharing determination unit
301 Inter-RAU IF
302 BB processing module
303 Device control module
304 Communication IF
401 RF module
402 BB processing module
403 Inter-BBU IF

The invention claimed is:

1. A radio communication system including a first base station, a second base station, a third base station that performs a communication with the first base station and the second base station, and a user equipment that performs a communication with the first base station and the second base station, the radio communication system comprising:
   a determination unit that determines allocation of signal processing that is commonly performed by the first base station and the second base station and signal processing that is performed by the third base station, based on a predetermined reference value;
   a first signal processor that performs the signal processing allocated to the first base station in accordance with the allocation that is determined by the determination unit;
   a second signal processor that performs the signal processing allocated to the second base station in accordance with the allocation that is determined by the determination unit; and
   a third signal processor that performs the signal processing allocated to the third base station in accordance with the allocation that is determined by the determination unit.

2. The radio communication system according to claim 1, wherein the predetermined reference value is a CRC check success rate, an SINR, or an SNR of an uplink signal that is transmitted from the user equipment or a downlink signal that is received by the user equipment, the number of retransmission times of the uplink signal or the downlink signal, or a channel estimation error, and
   wherein the determination unit determines the allocation of the signal processing that is commonly performed by the first base station and the second base station and the signal processing that is performed by the third base station based on the CRC check success rate, the SINR, or the SNR of the uplink signal that is transmitted from the user equipment or the downlink signal that is received by the user equipment, the number of retransmission times of the uplink signal or the downlink signal, or the channel estimation error.

3. The radio communication system according to claim 1, wherein the predetermined reference value is a processing load on the first base station, a processing load on the second base station, or a processing load on the third base station, and
   wherein the determination unit determines the allocation of the signal processing that is commonly performed by the first base station and the second base station and the signal processing that is performed by the third base station on based on the processing load on the first base station, the processing load on the second base station, or the processing load on the third base station.

4. The radio communication system according to claim 1, wherein the predetermined reference value is information indicating whether at least one of the number of antennas of the first base station and the number of antennas of the second base station is greater than or equal to the number of antennas of the user equipment, and
   wherein the determination unit determines the allocation of the signal processing that is commonly performed by the first base station and the second base station and the signal processing that is performed by the third base station based on whether at least one of the number of antennas of the first base station and the number of antennas of the second base station is greater than or equal to the number of antennas of the user equipment.

5. The radio communication system according to claim 2, wherein the determination unit determines that entire layer 1 signal processing of the uplink signal is performed by the first signal processor of the first base station and the second signal processor of the second base, upon determining that the CRC check success rate, the SINR, or the SNR of the uplink signal that is transmitted from the user equipment or the downlink signal that is received by the user equipment is greater than or equal to a predetermined threshold value, upon determining that the number of retransmission times of the uplink signal that is transmitted from the user equipment or the downlink signal that is received by the user equipment is less than a predetermined threshold value, or upon determining that the channel estimation error of the uplink signal that is transmitted from the user equipment or the downlink signal that is received by the user equipment is less than a predetermined threshold value, and
   wherein the third signal processor performs layer 2 signal processing using one of a signal that is processed by the first signal processor and a signal that is processed by the second signal processor.

6. The radio communication system according to claim 2, wherein the determination unit determines that a part of the layer 1 signal processing of the uplink signal is performed by the first signal processor of the first base station and the second signal processor of the second base station and a remaining part of the layer 1 signal processing is performed by the third signal processor of the third base station upon determining that the CRC check success rate, the SINR, or the SNR of the uplink signal that is transmitted from the user equipment or the downlink signal that is received by the user equipment is less than a predetermined threshold value, upon determining that the number of retransmission times of the uplink signal that is transmitted from the user equipment or the downlink signal that is received by the user equipment is greater than or equal to a predetermined threshold value, or upon determining that the channel estimation error of the uplink signal that is transmitted from the user equipment or the downlink signal that is received by the user equipment is greater than or equal to a predetermined threshold value, and
   wherein the third signal processor performs a remaining part of the layer 1 signal processing and layer 2 signal processing by using both of a signal that is processed by the first signal processor and a signal that is processed by the second signal processor.

* * * * *